US012558667B2

(12) United States Patent
Pilla et al.

(10) Patent No.: US 12,558,667 B2
(45) Date of Patent: Feb. 24, 2026

(54) ACTIVATED CARBON FOR REMOVAL OF TASTE AND ODOR COMPOUNDS FROM WATER

(71) Applicant: CLEMSON UNIVERSITY, Clemson, SC (US)

(72) Inventors: Srikanth Pilla, Clemson, SC (US); James Scott Sternberg, Clemson, SC (US); Tanju Karanfil, Clemson, SC (US); Esat Ariturk, Clemson, SC (US)

(73) Assignee: CLEMSON UNIVERSITY RESEARCH FOUNDATION, Clemson, SC (US)

( * ) Notice: Subject to any disclaimer, the term of this patent is extended or adjusted under 35 U.S.C. 154(b) by 708 days.

(21) Appl. No.: 17/961,203

(22) Filed: Oct. 6, 2022

(65) Prior Publication Data

US 2023/0107676 A1 Apr. 6, 2023

Related U.S. Application Data

(60) Provisional application No. 63/252,899, filed on Oct. 6, 2021.

(51) Int. Cl.
*B01J 20/20* (2006.01)
*B01J 20/28* (2006.01)
*B01J 20/30* (2006.01)

(52) U.S. Cl.
CPC ......... *B01J 20/20* (2013.01); *B01J 20/28064* (2013.01); *B01J 20/28066* (2013.01); *B01J 20/28076* (2013.01); *B01J 20/3078* (2013.01)

(58) Field of Classification Search
CPC ........................... B01J 20/20; B01J 20/28064; B01J 20/28066; B01J 20/28076; B01J 20/3078
See application file for complete search history.

(56) References Cited

FOREIGN PATENT DOCUMENTS

JP 2017178723 * 10/2017 ........... C01B 32/336

OTHER PUBLICATIONS

Machine translation of JP2017178723. (Year: 2017).*
Qing, Q. et al., 2017, Industrial Crops and Products, 109, 391-397. (Year: 2017).*
U.S. Appl. No. 11/036,085, filed Jun. 15, 2021, Gordon et al.
Alemdar et al. "Isolation and characterization of nanofibers from agricultural residues—wheat straw and soy hulls". Bioresour. Technol., 99 (2008), pp. 1664-1671.
American Water Works Association (AWWA); The American Society of Civil Engineers (ASCE), 2012. Water Treatment Plant Design, Fifth Edition.
American Water Works Association. "AWWA Standard: Granular Activated Carbon", ANSI/AWWA B604-05. 2006 Denver CO: American Water Works Association Research Foundation.

(Continued)

*Primary Examiner* — Brian A Mccaig
(74) *Attorney, Agent, or Firm* — DORITY & MANNING, P.A.

(57) ABSTRACT

In general, the present disclosure is directed to a soyhull-based activated carbon. The soyhull-based activated carbon comprises a Brunauer-Emmett-Teller (BET) surface area of from about 750 m²/g to about 2900 m²/g and a micropore volume of from about 0.50 cm³/g to about 1.2 cm³/g.

20 Claims, 17 Drawing Sheets

(56) References Cited

OTHER PUBLICATIONS

Bruce et al. "Removal of 2-methylisoborneol and geosmin in surface water treatment plants in Arizona". Journal of Water Supply: Research and Technology—Aqua 2002 51, 183-198.

CB Tech Coal vs. Wood vs. Coconut Carbon Filters | https://www.carbonblocktech.com/coconut-wood-coal-filters/ (accessed Mar. 7, 2019).

Chen et al. "Evaluation of granular activated carbons for removal of methylisoborneol to below odor threshold concentration in drinking water." Water Research 1997 31, 1155-1163.

Cision "Global and China Activated Carbon Market 2017-2021—6 Foreign and 19 Chinese Activated Carbon Enterprises" https://www.prnewswire.com/news-releases/global-and-china-activated-carbon-market-2017-2021---6-foreign-and-19-chinese-activated-carbon-enterprises-300502107.html (accessed Mar. 7, 2019).

Clercin et al. "Influence of Environmental Factors on the Production of MIB and Geosmin Metabolites by Bacteria in a Eutrophic Reservoir". Water Resour. Res. 2019 55, 5413-5430.

Collivignarelli et al. "AOPs with ozone and UV radiation in drinking water: contaminants removal and effects on disinfection byproducts formation". Water Science and Technology 2004 49, 51-56.

Considine et al. "The influence of surface chemistry on activated carbon adsorption of 2-methylisoborneol from aqueous solution". Colloids and Surfaces A: Physicochemical and Engineering Aspects 2001 179, 271-280.

Cook et al. "Can we predict the removal of MIB and geosmin with PAC by using water quality parameters?" Water Supply 2004 4, 221-226.

Cook et al. "The application of powdered activated carbon for mib and geosmin removal: predicting pac doses in four raw waters". Water Research 2001 35, 1325-1333.

Croue et al. "Isolation, Fractionation and Characterization of Natural Organic Matter in Drinking Water" AWWA Research Foundation and AWWA: 2000 Denver, CO.

Dastgheib et al. "Tailoring activated carbons for enhanced removal of natural organic matter from natural waters". Carbon 2004 42, 547-557.

Dionigi et al. "Evaluation of geosmin and 2-methylisoborneol on the histidine dependence of TA98 and TA100 *Salmonella typhimurium* tester strains". Water Research 1993 27, 1615-1618.

Donati et al. "Microcystin-LR adsorption by powdered activated carbon". Water Research 1994 28, 1735-1742.

Dou et al. "Food waste across the supply chain: a U.S. perspective on a global problem". Council for Agricultural Science and Technology CAST, Ames, Iowa, 2016 239-257.

Fakioglu et al. "Evaluation of algae related taste and odor problem in drinking water". Pamukkale Üniversitesi Mühendislik Bilimleri Dergisi. 2018 24-6, 1141-1156.

Food and Agriculture Organization of the United Nations, "Soybeans" accessed Jan. 1, 2021, http://www.fao.org/land-water/databases-and-software/crop-information/soybean/en/.

Gerber et al. "Geosmin, an earthy smelling substance isolated from actinomycetes". Applied Microbiology, 1965 13(6), 935-938.

Giglio et al. "Biosynthesis of 2-Methylisoborneol in Cyanobacteria". Environ. Sci. Technol. 2011 45, 992-998.

Gillogly et al. "14 C-MIB adsorption on PAC in natural water". Journal—American Water Works Association 1998 90, 98-108.

Girgis et al. "Development of micro-mesoporous carbons from several seed hulls under varying conditions of activation". Microporous and Mesoporous Materials vol. 2011 142, 2-3, 518-525.

Girgis et al. "Development of Porosity and Copper(II) Ion Adsorption Capacity by Activated Nano-Carbon Xerogels in Relation to Treatment Schemes". Adsorption Science & Technology 2011 29, 943-961.

Glaze et al. "Evaluating Oxidants for the Removal of Model Taste and Odor Compounds From a Municipal Water Supply". Journal—American Water Works Association, 1990 82: 79-84.

Graham et al. "Modeling equilibrium adsorption of 2-methylisoborneol and geosmin in natural waters". Water Research 2000 34, 2291-2300.

Gro Intelligence "Cuckoo for Coconuts: Demand Is Soaring, but Production Isn't Keeping Up" https://gro-intelligence.com/insights/coconuts-growing-demand-stagnant-production (accessed Mar. 7, 2019).

Hadi et al. "Significance of microporosity on the interaction of phenol with porous graphitic carbon". Chemical Engineering Journal 2015 269, 20-26.

Hepplewhite et al. "NOM and MIB, who wins in the competition for activated carbon adsorption sites?" Water Science and Technology 2004 49, 257-265.

Ho et al. "Biodegradation rates of 2-methylisoborneol (MIB) and geosmin through sand filters and in bioreactors". Chemosphere 2007 66, 2210-2218.

Huddleston etl al. "Adaptive Water Resource Management for Taste and Odor Control for the Anderson Regional Joint Water System" CORE.

Huisman et al. "Cyanobacterial blooms". Nat Rev Microbiol 2018 16, 471-483.

Iupac "Manual of Symbols and Terminology For Physicochemical Quantities and Units", Appendix 2, Pt 1, Colloid and Surface Chemistry. D. Pure Appl. Chem. 31(1972) 578.

James Sternberg "Green Synthetic Routes to High Performance Polymers from Lignin: Upcycled Materials Designed for Recycling" (Doctoral dissertation) Clemson University, Clemson, South Carolina 2020.

Johns et al. "Agricultural By-Products as Granular Activated Carbons for Adsorbing Dissolved Metals and Organics". *J. Chem. Technol. Biotechnol.* 1998, 71 (2), 131-140.

Jung et al. "Treatment of taste and odor material by oxidation and adsorption". Water Science and Technology 2004 49, 289-295.

Juttner et al. "Biochemical and Ecological Control of Geosmin and 2-Methylisoborneol in Source Waters". AEM 2007 73, 4395-4406.

Karanfil et al. "Adsorption of Organic Macromolecules by Granular Activated Carbon. 2. Influence of Dissolved Oxygen". Environ. Sci. Technol. 1996 30, 2195-2201.

Karanfil et al. "Role of Granular Activated Carbon Surface Chemistry on the Adsorption of Organic Compounds. 2. Natural Organic Matter". Environ. Sci. Technol. 1999 33, 3225-3233.

Karanfil et al. "Survey of DOC and UV Measurement Practices with Implications to SUVA Determination" Journal of American Water Works Association, 94, (12) 68-80 (2002).

Knappe et al. "Predicting the Capacity of Powdered Activated Carbon for Trace Organic Compounds in Natural Waters". Environ. Sci. Technol. 1998 32, 1694-1698.

Lalezary et al. "Evaluating Activated Carbons for Removing Low Concentrations of Taste- and Odor-Producing Organics". Journal—American Water Works Association 1986 78, 76-82.

Lalezary et al. "Oxidation of Five Earthy-Musty Taste and Odor Compounds". Journal—American Water Works Association 1986 78, 62-69.

Lalezary-Craig et al. "Optimizing the Removal of Geosmin and 2-Methylisoborneol by Powdered Activated Carbon". Journal—American Water Works Association 1988 80, 73-80.

Li et al. "Effects of activated carbon surface chemistry and pore structure on the adsorption of organic contaminants from aqueous solution". Carbon 2002 40, 2085-2100.

Li et al. "Importance of activated carbon's oxygen surface functional groups on elemental mercury adsorption" Fuel 2003 (82) 451-457.

Li et al. "Study of the binding regularity and corresponding mechanism of drinking water odorous compound 2-MIB with coexisting dissolved organic matter". Chem. Eng. J. 2020 395, 125015.

Liu et al. "Waste Biomass Based-Activated Carbons Derived fromSoybean Pods as Electrode Materials for High-Performance Supercapacitors". Chemisty Europe 2018 3, 5726-5732.

Lundgren et al. "Formation and Removal of Off-Flavour Compounds during Ozonation and Filtration through Biologically Active Sand Filters". Water Sci Technol. 1988 20 (8-9): 245-253.

(56) References Cited

OTHER PUBLICATIONS

Ma et al. "Adsorption of geosmin and 2-methylisoborneol onto granular activated carbon in water: isotherms, thermodynamics, kinetics, and influencing factors." Water Science and Technology 2019 80, 644-653.

Marshall et al. "Enhanced metal adsorption by soybean hulls modified with citric acid".Bioresource Technology 1999 69-3, 263-268.

Matsui et al. "Adsorption capacities of activated carbons for geosmin and 2-methylisoborneol vary with activated carbon particle size: Effects of adsorbent and adsorbate characteristics". Water Research 2015 85, 95-102.

Matsui et al. "Geosmin and 2-methylisoborneol adsorption on super-powdered activated carbon in the presence of natural organic matter". Water Science and Technology 2010 62, 2664-2668.

Matsui et al. "Geosmin and 2-methylisoborneol removal using superfine powdered activated carbon: Shell adsorption and branched-pore kinetic model analysis and optimal particle size". Water Research 2013 47, 2873-2880.

Miao et al. "Activated carbon prepared from soybean straw for phenol adsorption". Journal of the Taiwan Institute of Chemical Engineers 2013 44-3, 458-465.

Najm et al. "Using Powdered Activated Carbon: A Critical Review", Journal (American Water Works Association), 1991 vol. 83, No. 1, pp. 65-76.

Nancy N. Gerber "A volatile metabolite of actinomycetes, 2-methylisoborneol". Journal of Antibiotics, 1969 22(10), 508-509.

NASA "2020 Tied for Warmest Year on Record" NASA Analysis Shows 2021.

National Standard of the People's Republic of China, "Standards for Drinking Water Quality." 2006, GB 5749-2006, Ministry of Health of China Standardization Administration of China, accessed Jan. 1, 2021.

Neto et al. "Extraction and characterization of cellulose nanocrystals from agro-industrial residue—Soy hulls". Industrial Crops and Products. 2013 42, 480-488.

Newcombe et al. "Simultaneous adsorption of MIB and NOM onto activated carbon II. Competitive effects". Carbon 2002 40, 2147-2156.

Newcombe etl al. "Influence of characterised natural organic material on activated carbon adsorption: II. Effect on pore volume distribution and adsorption of 2-methylisoborneol". Water Research 1997 31, 1065-1073.

Nowack et al. "Enhancing Activated Carbon Adsorption of 2-Methylisoborneol: Methane and Steam Treatments". Environ. Sci. Technol. 2004 38, 276-284.

Paerl et al. "Climate change: a catalyst for global expansion of harmful cyanobacterial blooms". Environmental Microbiology Reports 2009 1, 27-37.

Partlan et al. "Effect of bead milling on chemical and physical characteristics of activated carbons pulverized to superfine sizes". Water Research 2016 89, 161-170.

Pelekani et al. "A kinetic and equilibrium study of competitive adsorption between atrazine and Congo red dye on activated carbon: the importance of pore size distribution". Carbon 2001 39, 25-37.

Pendleton et al. "Properties of activated carbon controlling 2-Methylisoborneol adsorption". Carbon 1997 35, 1141-1149.

Perera et al. "Quantitative Characterization of Nut Yield and Fruit Components in Indigenous Coconut Germplasm in Sri Lanka". Int. J. Biodivers. 2014, 2014, 1-5.

Perkins et al. "Managing taste and odour metabolite production in drinking water reservoirs: The importance of ammonium as a key nutrient trigger". Journal of Environmental Management 2019 244, 276-284.

Peter et al. "Occurrence of dissolved and particle-bound taste and odor compounds in Swiss lake waters". Water Research 2009 43, 2191-2200.

Pirbazari et al. "GAC adsorber design protocol for the removal of off-flavors". Water Research 1993 27, 1153-1166.

Pirbazari et al. "Physical Chemical Characterization of Five Earthy-Musty-Smelling Compounds". Water Science and Technology 1992 25, 81-88.

Qiuli Lu "Adsorption of Phenolics on Activated Carbon-Impact of Pore Size Distribution". (Electronic Thesis or Dissertation). 2006 Retrieved from https://etd.ohiolink.edu/.

Quinlivan et al. "Effects of activated carbon characteristics on the simultaneous adsorption of aqueous organic micropollutants and natural organic matter". Water Research 2005 39, 1663-1673.

Rangel-Mendez et al. "Improved activated carbon by thermal treatment in methane and steam: Physicochemical influences on MIB sorption capacity". Carbon 2005 43, 467-479.

Rashash et al. "FPA of selected odorous compounds". Journal—American Water Works Association 1997 89, 131-141.

Rosenfeldt et al. "UV and UV/H2O2 treatment of methylisoborneol (MIB) and geosmin in water". J. Water Supply Res. Technol.—Aqua 2005 54, 423-434.

Srinivasan et al. "Elimination of persistent odorous compounds from drinking water". Water Supply 2008 8, 121-127.

Srinivasan et al. "Treatment of taste and odor causing compounds 2-methyl isoborneol and geosmin in drinking water: A critical review". Journal of Environmental Sciences 2011 23, 1-13.

Suffet et al. "AWWA taste and odor survey." Journal—American Water Works Association 1996 88, 168-180.

Tan et al. "Biochar as Potential Sustainable Precursors for Activated Carbon Production: Multiple Applications in Environmental Protection and Energy Storage". Bioresour. Technol. 2017, 227, 359-372.

Tay et al. "Preparation and characterization of activated carbon from waste biomass". Journal of Hazardous Materials, 2009 165, 481-485.

Tennant et al. "The role of surface acidity and pore size distribution in the adsorption of 2-methylisoborneol via powdered activated carbon". Carbon 2007 45, 858-864.

Thomas et al. "Effects of temperature and nitrogen availability on the growth of invasive and native cyanobacteria". Hydrobiologia 2016 763, 357-369.

University of Missouri Extension. "All By-Products, Sorted by Company" http://agebb.missouri.edu/dairy/byprod/allcompanies.asp (accessed Mar. 11, 2019).

USDA, Soybeans & Oil Crops., USDA, Accessed Jul. 5, 2021, https://www.ers.usda.gov/topics/crops/soybeans-oil-crops/.

USDA, Soybeans: Production by County., USDA, accessed Jan. 1, 2021, https://www.nass.usda.gov/Charts_and_Maps/Crops_County/sb-pr.php.

Value Notes "Home Water Purifier Industry India" Market Intelligence Dashboard Source of Data Data Availability Industry Structure; 2014.

Watanabe et al. "Removal of 2-methylisoborneol from aqueous solution by cattle manure compost (CMC) derived activated carbons". Journal of Water Supply: Research and Technology—Aqua 2014 63, 239-247.

Watson et al. "Off flavours in large waterbodies: physics, chemistry, and biology in synchrony". Water Science and Technology 2007 55, 1-8.

Watson et al. "Quantitative analysis of trace levels of geosmin and MIB in source and drinking water using headspace SPME". Water Research 2000 34, 2818-2828.

Westerhoff et al. "Seasonal occurrence and degradation of 2-methylisoborneol in water supply reservoirs". Water Research 2005 39, 4899-4912.

Young et al. "Taste and odour threshold concentrations of potential potable water contaminants" Water Research 1996 30, 331-340.

Yu et al. "Effects of surface characteristics of activated carbon on the adsorption of 2-methylisobornel (MIB) and geosmin from natural water". Separation and Purification Technology 2007 56, 363-370.

Yu et al. "Prediction of powdered activated carbon doses for 2-MIB removal in drinking water treatment using a simplified HSDM approach". Chemosphere 2016 156, 374-382.

(56) References Cited

OTHER PUBLICATIONS

Zamyadi et al. "Fate of geosmin and 2-methylisoborneol in full-scale water treatment plants". Water Research 2015 83, 171-183.

* cited by examiner

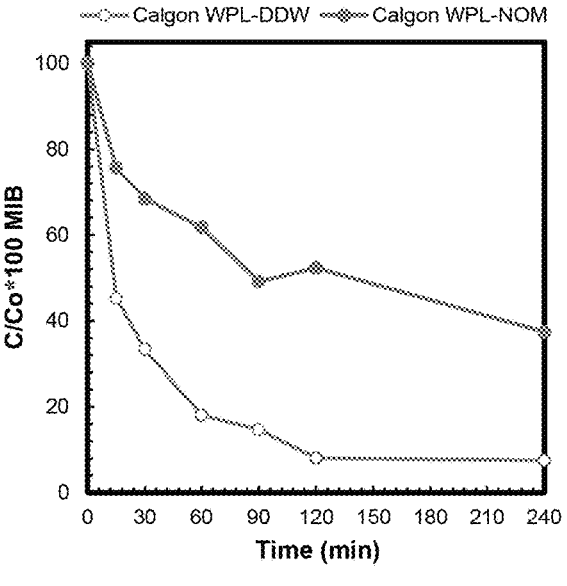
FIG. 3A
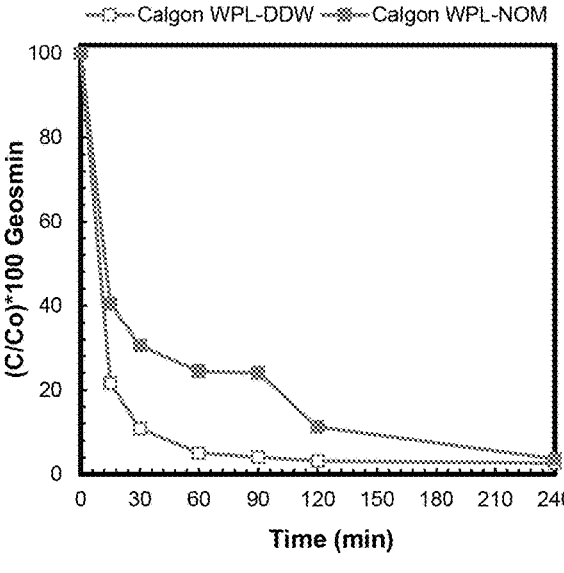
FIG. 3C
FIG. 3B
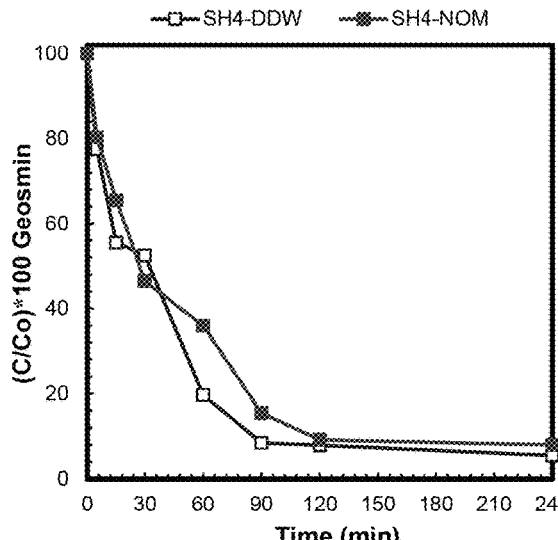
FIG. 3D

5.8 Å

5.5 Å

MIB 5.4 Å

5.8 Å

4.7 Å

Geosmin 6.8 Å

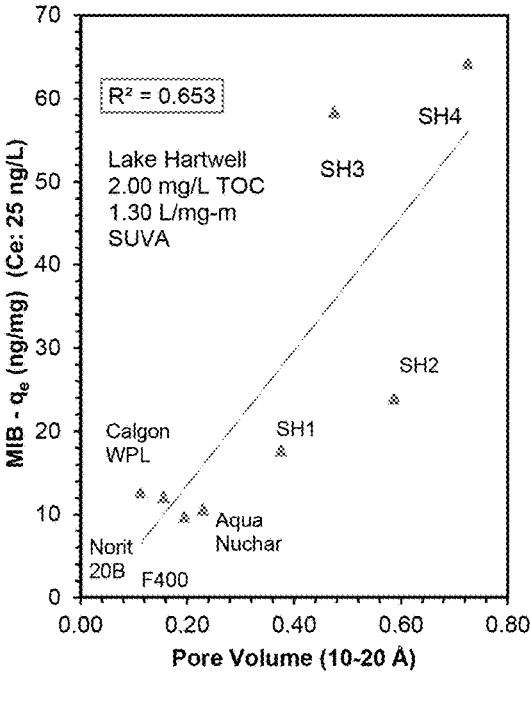
FIG. 20A
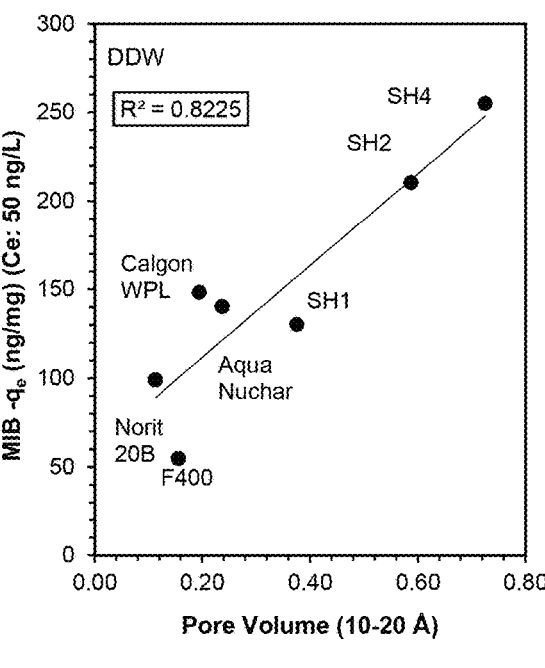
FIG. 20C
FIG. 20B
FIG. 20D

ACTIVATED CARBON FOR REMOVAL OF TASTE AND ODOR COMPOUNDS FROM WATER

CROSS REFERENCE TO RELATED APPLICATION

The present application claims priority to U.S. Provisional Patent Application Ser. No. 63/252,899, having a filing date of Oct. 6, 2021, entitled "Powdered Activated Carbon for Removal of Taste and Odor Compounds from Water," which is incorporated herein by reference in its entirety.

BACKGROUND

Many naturally occurring organic and inorganic materials that exist in water are undesirable materials for delivery to consumers. Taste and odor (T&O) compounds in source waters can deteriorate the aesthetic quality of water, representing a concern for consumers even if posing no health concerns. For example, 2-Methylisoborneol (MIB) and trans-1,10-dimethyl-trans-9-decalol (geosmin) are identified as major taste and odor problems causing compounds in source waters. Some consumers are very sensitive to these compounds and can sense the smell at concentrations as low as 10 ng/L. T&O compounds are perceived as an indicator of the safety and suitability of water, and thus, an effective treatment is required to remove such materials and to maintain the aesthetic quality of drinking water.

Conventional clarification processes (chlorination, coagulation, flocculation, and sedimentation), sand filtration, and disinfection are often not capable of effectively removing T&O compounds, and water utilities are constantly in search of reliable treatment technologies and approaches. Several treatment techniques, such as adsorption, oxidation, and biodegradation, have been applied to address this challenge. However, some contaminants, including T&O compounds (e.g., MIB and geosmin), may resist such treatment, including treatment by use of commonly used oxidants (i.e., $Cl_2$, $ClO_2$, and $KMnO_4$). Although ozone oxidation combined with ultraviolet (UV) is capable of effectively removing many T&O compounds, major limitations to this approach include the possible formation of regulated disinfection by-products (DBPs) (e.g., bromate), in addition to relatively high capital and operational costs. Given the nature of T&O challenges, powdered activated carbon (PAC) has been utilized as an effective and practical technique to remove T&O compounds, particularly MIB and geosmin, due to its relatively low cost and ease of incorporation into existing treatment trains.

The presence of natural organic matter (NOM) in source waters decreases the adsorption of T&O compounds by activated carbon due to competitive binding and/or pore blockage. Further, competition from other components of the source water background, high-dose demands resulting from excessive concentrations of T&O compounds in source waters, and additional solid residual management needs are some of the challenges presented by the use of activated carbon. Several factors-Brunauer-Emmett-Teller (BET) surface area, pore size distribution (micro- and mesoporosity), surface chemistry, raw material type, physicochemical properties of T&O compounds, and their concentration in sources, and type and abundance of NOM-affect the adsorption of these as well as other T&O compounds during drinking water treatment.

What is needed in the art are improved adsorbent materials from more sustainable sources that are able to produce a highly developed pore structure and adsorption performance.

SUMMARY

In general, the present disclosure is directed to an activated soyhull-based carbon material. The activated soyhull-based carbon material comprises a Brunauer-Emmett-Teller (BET) surface area of from about 750 $m^2$/g to about 2900 $m^2$/g and a micropore volume of from about 0.50 $cm^3$/g to about 1.2 $cm^3$/g.

Also, the present disclosure is directed to a method of removing a contaminant from an aqueous medium post-chlorination. The method comprises contacting the aqueous medium comprising one or more contaminants with a soyhull-based activated carbon; adsorbing the one or more contaminants by the soyhull-based activated carbon, wherein the one or contaminants are adsorbed by the soyhull-based activated carbon at an adsorption rate of greater than about 75% in about 90 minutes in the aqueous medium comprising at least about 5 mg/L of total organic carbon.

Further, the present disclosure is directed to a method for forming an activated carbon product. The method comprises carbonizing a soyhull in the absence of oxygen and then activating the carbonized material, for instance, according to a chemical or a thermal activation method. A chemical activation approach can include incubating the carbonized soyhull with a chemical activating agent; drying the carbonized soyhull material mixed with the hydroxide activating agent at a temperature of about 105° C. or greater; pyrolyzing the dried, carbonized soyhull material at a relatively low temperature, e.g., about 800° C. or less; washing the activated soyhull-based carbon to remove byproduct salts; and drying the washed, soyhull-based activated carbon. In another embodiment, the carbonized material can be activated according to a thermal activation approach, for instance, through contact of the materials with steam or carbon dioxide at a relatively low temperature, e.g., about 800° C. or less.

These and other features and aspects, embodiments and advantages of the present invention will become better understood with reference to the following description and appended claims.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 3A presents adsorption kinetics of MIB by Calgon Carbon™ WPL®.

FIG. 3B presents adsorption kinetics of MIB by SH4.

FIG. 3C presents adsorption kinetics of geosmin by Calgon Carbon™ WPL®.

FIG. 3D presents adsorption kinetics of geosmin by SH4.

FIG. 20A presents correlation between adsorption capacity and pore size distribution in lake water for MIB in different equilibrium concentrations.

FIG. 20B presents correlation between adsorption capacity and pore size distribution in lake water for geosmin in different equilibrium concentrations.

FIG. 20C presents correlation between adsorption capacity and pore size distribution in DDW for MIB in different equilibrium concentrations.

FIG. 20D presents correlation between adsorption capacity and pore size distribution in DDW for geosmin in different equilibrium concentrations.

Figure 1A:
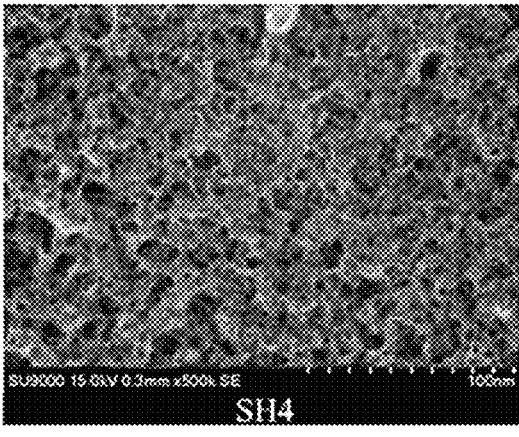
FIG. 1A presents an SEM micrograph of soyhull-based activated carbon (SH4) at ×500,000 magnification.
Figure 1B:
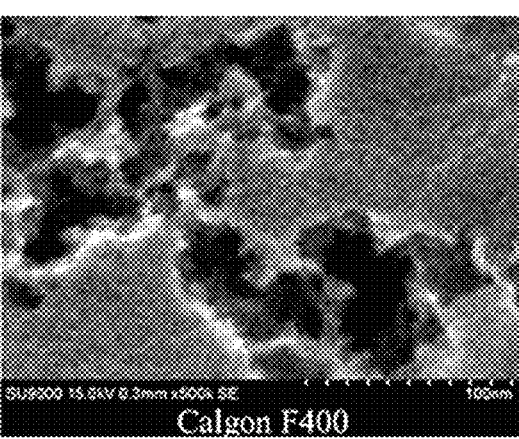
FIG. 1B presents an SEM micrograph of Calgon Carbon™ F400 at ×500,000 magnification.
Figure 1C:
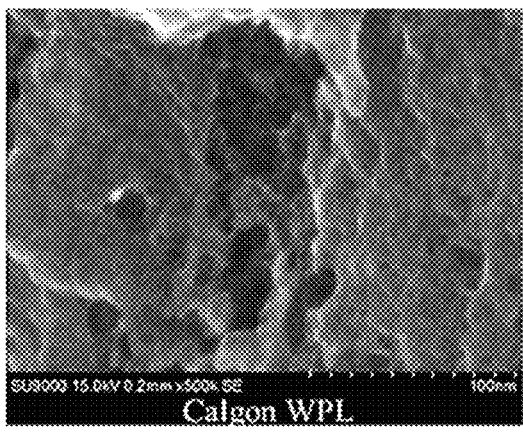
FIG. 1C presents an SEM micrograph of Calgon Carbon™ WPL® at ×500,000 magnification.
Figure 1D:
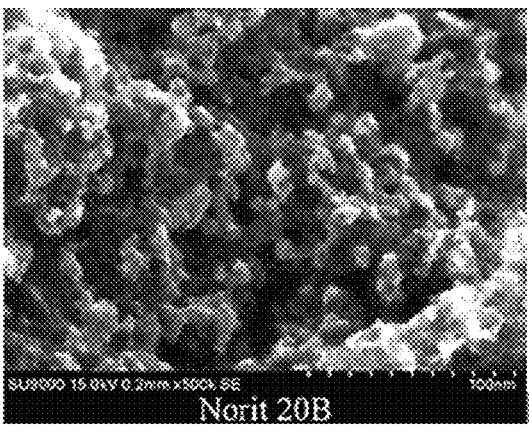
FIG. 1D presents an SEM micrograph of NORIT® 20B at ×500,000 magnification.
Figure 1E:
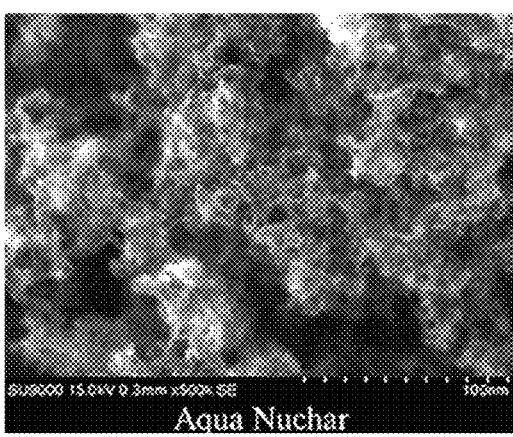
FIG. 1E presents an SEM micrograph of AquaNuchar® at ×500,000 magnification.

Repeat use of reference characters in the present specification and drawings is intended to represent the same or analogous features or elements of the present disclosure.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

In general, the present disclosure is directed to materials and methods for forming activated carbons through the low temperature activation of soyhull for the removal of contaminants from an aqueous medium and activated carbons formed according to the methods. Previously, it was believed that mesopore volume was pivotal to increase adsorption kinetics as they provide diffusion pathways to micropores. It was understood that without sufficient mesopore volume, diffusion into the micropores would be slow. Surprisingly, activated carbons disclosed herein have a high proportion of microporosity on the surface of the activated carbons and exhibit faster adsorption kinetics of T&O compounds compared to commercial powdered activated carbons. Without wishing to be bound to any particular theory, it is believed that the high proportion of total pores combined with the large concentration of micropores near the surface of the activated carbons provides the unexpected and improved adsorption kinetics of disclosed materials. In particular, it is understood that pore width of activated carbon affects the organic compound adsorption, and that the adsorption strength increases with decreasing pore width as contact points between the organic compound and activated carbon surface area increase.

According to the present disclosure, raw soyhulls may be utilized herein to form the activated carbon. Beneficially, in some embodiments, the raw soyhulls utilized herein need not be subjected to any washing and/or pretreatment prior to carbonization. However, in some embodiments, the raw soyhulls may be granulated prior to carbonization. For instance, the raw soyhulls may be pulverized and/or crushed to a desired particle size of less than about 10 millimeters (mm). Beneficially, disclosed formation methods do not require the addition of a binder to the granulated starting materials, and upon any desired sizing of the starting materials, the materials can be directly carbonized and activated.

Following any granulation, the starting materials can be carbonized. The term "carbonization" or "carbonizing" generally refers to heat treatment of an organic substance in an oxygen deprived atmosphere to form a carbon char. This heat treatment may occur under an atmosphere of, but not limited to, argon, nitrogen, helium, hydrogen, steam, or any combination thereof that can generally flow over the materials during processing to remove a considerable portion of oxygen surface functionalities on the materials. In one embodiment, the raw soyhulls may undergo carbonization in an argon atmosphere tube furnace at about 500° C. using a 10° C./min ramp-up rate for about 1 hour. Argon gas flow may be utilized to remove a considerable portion of oxygen surface functionalities on the carbon-based material and decrease the surface acidity.

Heat treatment may also lead to structural changes in the carbon-based starting materials. For example, heat treatment may lead to decreases in surface area and pore volume as well as changes to the pore size distribution. Such structural changes may be observed following heat treatment of the soyhull-based starting carbon materials.

According to the present disclosure, the carbonized materials may be activated utilizing a physical or chemical activation. For instance, the carbonized soyhulls may be physically activated (e.g., thermal activation) using steam and/or carbon dioxide. The carbonized material may be contacted with steam at a pyrolysis temperature of from about 700° C. to about 900° C., such as from about 750° C. to about 850° C., or any range therebetween.

In one embodiment, the carbonized soyhulls may be activated according to a chemical activation approach. In such an embodiment, the carbonized materials may be mixed with a chemical activating agent. The chemical activating agent may include, but is not limited to, a hydroxide activating agent such as potassium hydroxide (KOH), lithium hydroxide, sodium hydroxide, cesium hydroxide, rubidium hydroxide, or a combination thereof. In another embodiment, the chemical activating agent may include, but is not limited to, potassium carbonate ($K_2CO_3$). In yet another embodiment, phosphoric acid ($H_3PO_4$) can be added to the organic material and carbonized/activated in a one-step thermal process.

Regardless of the chemical activating agent utilized, the mixture can include a larger amount of the chemical activation agent by weight than the weight of the carbonized soyhull. For instance, the weight ratio of chemical activating agent to carbonized soyhulls can be from about 1:1 to about 6:1, such as 2:1 to about 4:1, or any range therebetween. The carbonized soyhulls and chemical activating agent mixture can be incubated at room temperature for about 6 hours. In some embodiments, following the incubation period, the carbonized soyhulls and chemical activating agent mixture can be dried overnight in a box furnace at 105° C. prior to activation.

The carbonized mixture may be heated up to a pyrolysis temperature for carbon activation. While the pyrolysis temperature is traditionally about 950° C. or greater, the pyrolysis temperature disclosed herein can be lower. For instance, the carbonized mixture may be heated to a pyrolysis temperature of from about 700° C. to about 900° C., such as from about 750° C. to about 850° C., such as from about 700° C. to about 800° C., or any range therebetween. The produced activated carbon of soyhulls with a chemical activating agent may be washed with water or a dilute acid to remove undesired materials, e.g., potassium salts or the like.

Combination of a thermal activation and a chemical activation approach may optionally be utilized. The activated carbon product may be a powdered activated carbon (PAC) or a granular activated carbon (GAC). For instance, the activated carbon product may be sieved to obtain a particle size from about 50 μm to about 80 μm, such as from about 55 μm to about 75 μm, or any range therebetween.

Independent of the activation method, the activated carbon formed according to methods disclosed herein may be utilized, in one embodiment, to remove contaminants from an aqueous medium.

The pore structure of the activated carbon produced herein may be divided into micropores (<20 Å), mesopores (20-500 Å), and macropores (>500 Å).

As utilized herein, the term "microporosity" refers to that portion of the surface area of an activated carbon distributed in pores, each having an average cross-sectional dimension of less than ABOUT 20 Å. In one embodiment, an activated carbon, as disclosed herein, may have a microporosity of from about 0.7 $cm^3$/g to about 1.5 $cm^3$/g, such as from about 0.8 $cm^3$/g to about 1.25 $cm^3$/g, such as from about 0.9 $cm^3$/g to about 1.1 $cm^3$/g, or any range therebetween.

As utilized herein, the term "mesoporosity" refers to that portion of the surface area of an activated carbon that is distributed in pores each having an average cross-sectional dimension of from about 20 Å to about 500 Å. In one embodiment, an activated carbon disclosed herein may have a mesoporosity of from about 0.20 cm³/g to about 0.40 cm³/g, such as from about 0.25 cm³/g to about 0.35 cm³/g, or any range therebetween.

In one embodiment, the activated carbon may be characterized by its BET surface area. The term "BET surface area" refers to the Brunauer-Emmett-Teller (BET) equation used to calculate surface area based on the analysis of a nitrogen adsorption isotherm at 77.5K. In one embodiment, the activated carbon disclosed herein may be characterized by a BET surface area of from about 1750 m²/g to about 3000 m²/g, or any range therebetween.

In one embodiment, the activated carbon may be characterized by its pore size distribution based on the analysis of a nitrogen adsorption isotherm at 77.5K. For example, Density Functional Theory (DFT) may be applied to determine the pore size distribution of PAC from the nitrogen isotherms. The distribution of pores may be determined by associating pore widths less than 20 Å as micropores, pores in the range of 20 Å-500 Å as mesopores, and those at 500 Å or larger as macropores.

In one embodiment, the activated carbon may be characterized by its total pore volume. The total pore volume may be calculated from the adsorbed volume of gas near the saturation point ($P/P_0$=0.98). In one embodiment, the total pore volume of an activated carbon may be calculated from the adsorbed volume of nitrogen near the saturation point ($P/P_0$=0.98). Micropore volume may be calculated using Dubinin-Radushkevich (DR) equation in the relative pressure range of $10^{-5}$ to $10^{-1}$. By subtracting micropore volume from the total volume, total meso- and macropore volume ($V_{mes}$+$V_{mac}$) can be determined. Reproducibility of measurements can be determined from triplicate data of randomly selected samples. In one embodiment, the activated carbon may have a total pore volume of from about 0.90 cm³/g to about 1.50 cm³/g, such as from about 0.95 cm³/g to about 1.45 cm³/g, such as from about 1.0 cm³/g to about 1.30 cm³/g, or any range therebetween.

Activated carbons produced from soyhulls, as disclosed herein, may be utilized in one embodiment in removal of contaminants from an aqueous medium. In one embodiment, an aqueous medium may be characterized as a water source comprising natural waters. The term "natural organic matter" (NOM) refers to organic compounds that are ubiquitous in various water sources (e.g., surface or ground waters) that result from decomposition of litter materials, leaves, or other organics, as well as algal (e.g., lysis, extra- and intracellular) activities. Water sources may be compared based on their differences in NOM characteristics as indicated by their $SUVA_{254}$ ($UV_{254}$/DOC) values. Water sources may include, but are not limited to, raw waters collected from a lake and a river intake (which serve as water sources of drinking water treatment plants) and treated water (e.g., after chlorination, coagulation, flocculation, and sedimentation).

Contaminants that are resistant to commonly used oxidants may be present in water sources' post-conventional clarification processes. In one embodiment, such a contaminant may be removed from a water source using an activated carbon, as disclosed. The expression "T&O compounds" refers to compounds of natural or anthropogenic origin that may result in taste and order problems in water. In one embodiment, the contaminant comprises a cyanobacteria-derived metabolite characterized as a T&O compound. Cyanobacteria refers to oxygen-producing photosynthetic microorganisms. Nearly 3-3.5 billion years ago, cyanobacteria started to produce oxygen as a byproduct. They have had a significant impact on transforming the Earth's atmosphere and climate by releasing oxygen. Cyanobacteria have adapted to almost every environment on the planet, including marine and freshwater sources. Nutrients (nitrogen and phosphorus) typically enhance the growth and abundance of cyanobacteria in water bodies, and due to the overuse of fertilizers, inadequate wastewater treatment, etc., lakes and rivers are rich in such nutrients. Global warming, as well as the associated reduced water quality, cause an increase in cyanobacteria growth as high temperatures favor cyanobacterial growth. For example, many bloom-forming cyanobacteria reach their maximal growth at high temperatures (i.e., often above 25° C.). Therefore, cyanobacteria can become abundant in an aquatic environment resulting in blooms during warmer months. T&O compounds, MIB, and geosmin are synthesized during cyanobacteria's growth phase and released during the biological decomposition. Moreover, cyanobacteria can release T&O compounds even though they do not form blooms. Accordingly, a water source may contain a cyanobacteria-derived metabolite post-chlorination that is characterized by having a molecular weight of about 150 g/mol to about 185 g/mol, such as from about 160 g/mol to about 175 g/mol, or any range therebetween. For example, a cyanobacteria-derived metabolite to be removed from water according to disclosed methods may be MIB (168.3 g/mol) or geosmin (182.3 g/mol).

In one embodiment, activated carbons disclosed herein can successfully remove a contaminant, such as a small molecule, from a water source. "Small molecule" as used herein is characterized by having a molecular weight from about 100 g/mol to about 500 g/mol, such as from about 150 g/mol to about 400 g/mol, such as from about 250 g/mol to about 350 g/mol, or any range therebetween. In one embodiment, a water source may contain a small molecule present post-chlorination having a molecular weight of from about 160 g/mol to about 185 g/mol.

According to one embodiment of the present disclosure, activated carbons disclosed herein exhibit improved affinity for T&O compounds. One aspect of the disclosure is directed to methods for developing the beneficial combination of physical and chemical characteristics in activated carbon materials so as to improve the adsorption characteristics of the activated carbon for T&O compounds. In particular, improved adsorption of activated carbon may be attained through the development and formation of activated carbons produced from soyhulls, as disclosed herein.

In one embodiment, the PAC can exhibit a porosity that can provide an affinity of the activated carbon for T&O compounds. For instance, the activated carbon can exhibit a microporosity, mesoporosity, total porosity, and combinations thereof, which can provide a high affinity for T&O compounds.

In one embodiment, the T&O compounds may be adsorbed by the soyhull-based activated carbon at an adsorption rate of greater than about 75% in about 90 minutes in the aqueous medium comprising at least about 5 mg/L of total organic carbon, such as greater than about 80% in about 90 minutes, such as greater than about 85% in about 90 minutes, or any range therebetween.

Depending on the water source and compound being adsorbed, activated soyhull-based carbons disclosed herein have an adsorbance capacity of from about 0.5 ng/mL to about 45 ng/ml, such as from about 2 ng/ml to about 35 ng/ml, such as from about 5 ng/ml to about 30 ng/mL, such as from about 10 ng/ml to about 25 ng/mL, or any range therebetween in the presence of a natural organic matter (NOM).

The present disclosure may be better understood with reference to the Examples set forth below.

EXAMPLES

Materials and Methods

Activated Carbons

Raw soyhulls were provided from Archer Daniel Midland Company and used without washing or pretreatment. After crushing to a particle size of a few millimeters, raw materials were initially carbonized for one hour at 500° C. (OTF 1500x from MTI) in the absence of oxygen under 100 standard cubic centimeters per minute (sccm) of argon gas flow. Carbonization was followed by chemical impregnation with KOH (4:1 by mass) in 20 mL of DDW for six hours and drying overnight in a furnace at 105° C. Then, the dried mixture was activated at 750° C. for one hour. According to the results obtained during the research period, modifications were made to the method applied, and four different batches of activated carbons were produced. They are denoted as SH1, SH2, SH3, and SH4 throughout the study. Specifically, SH4 had a longer cooling time which resulted in the best characteristics among the soyhull-based and studied PACs in terms of BET surface area and micropore volume, after activation in the furnace. Four commercially available activated carbons, Calgon Carbon™ WPL® (bituminous coal-based), Calgon Carbon™ FILTRASORB® (FILTRASORB®) (bituminous coal-based), Westvaco™ AquaNuchar® (wood-based), and NORIT® 20B (bituminous coal-based) were also used for comparison with the activated soyhull-based activated carbons.

Since the products and commercial PACs have various particles sizes, larger particles were crushed, and ground PACs were sieved with a Micro Sieve Shaker kit to obtain a 50-70 μm particle size range. Then, the PACs were rinsed in a glass container with DDW, dried in an oven at 105° C. for 24 hours, cooled to room temperature, and stored in a desiccator until characterization and adsorption tests. Nitrogen adsorption at 77.5 K was performed with a physisorption analyzer (Micromeritics® ASAP® 2020) to determine BET surface area, pore volume, and pore size distributions of PACs. DFT model was used to determine the pore size distribution of PAC from the nitrogen isotherms. PAC surface chemistry was characterized with the pH of point of zero charges ($pH_{PZC}$) determination based on a pH equilibrium method. For $pH_{PZC}$ test, 20 mL solutions were prepared using 0.1 M NaCl, and HCl or NaOH was added to reach different initial pH values (2, 4, 6, 8, 10, and 12). To obtain 5 g-PAC contents in one liter, 100 mg PACs were added to the solutions. After 24 hours, $pH_{PZC}$ of PAC was determined by measuring the final pH of each solution.

Scanning electron microscopy (SEM) imaging analyses were performed to obtain the surface morphology, topography, and microstructure analysis of adsorbents. SEM images were obtained using Hitachi™ SU9000 ultra-high resolution scanning electron microscope. Hitachi™ SU9000 has a resolution of 0.4 nm at 30 kV, and it is currently considered one of the highest resolution SEMs available in the market. SEM sample preparation was performed by mounting specimen on 4 mm×10 mm mounts using double-sided adhesive carbon tape. The surfaces of the specimen were cleaned for 10 minutes using a vacuum UV cleaner before imaging to remove surface contaminants. Despite the Hitachi™ SU9000 being a high vacuum Field Emission (FE)-SEM, no specimen precoating of conducting layer was applied to image sample surfaces, leaving them in as-is condition. The microscope was operated at an acceleration voltage of 15 kV and a filament emission current of 10 mA. Images were captured using a secondary electron in a lens detector at ×100,000, ×500,000, ×1000,000, and ×2,000,000 magnification. (FIGS. 1A-1E).

MIB and Geosmin Analyses

Figure 7A:
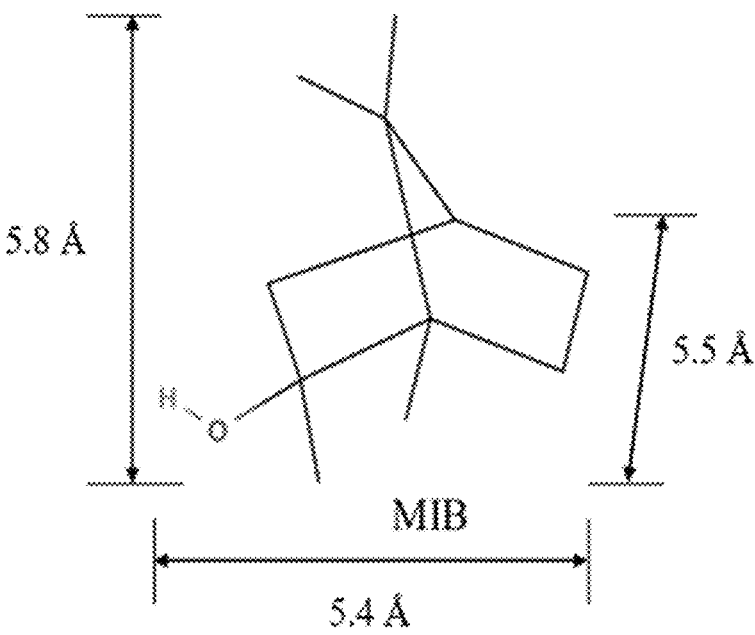
FIG. 7A presents molecular structure of MIB.
Figure 7B:
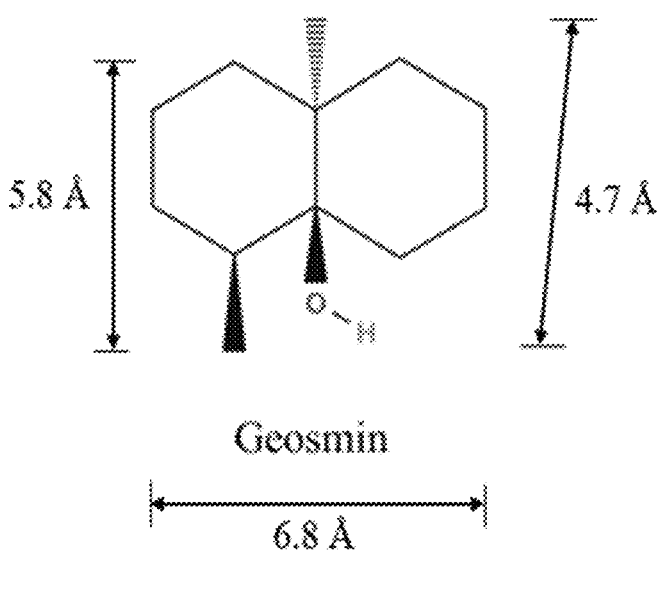
FIG. 7B presents molecular structure of geosmin.

MIB and geosmin were purchased from FUJIFILM™ Wako Pure Chemicals USA Corporation in powder form. Each primary dilution solution with 4 mg L−1 concentration was prepared separately by mixing a pre-determined amount of powders with DDW (resistivity ≥18 mΩ cm). The primary dilution solution was kept in the refrigerator at 4° C. MIB and geosmin were analyzed by using headspace solid-phase microextraction gas chromatography/mass spectrometry (SPME-GC/MS/MS). An Agilent™ 7890B Gas Chromatograph coupled to an Agilent™ 7000C Triple Quadrupole Mass Spectrometer was used for MIB and geosmin quantification analysis. All extractions were performed using a PAL automated SPME system with a 50/30 μm Divinylbenzene/Carboxen®/Polydimethylsiloxane (DVB/CAR/PDMA) fiber assembly (Supelco®). The minimum reporting levels for MIB and geosmin were 1 ng L$^{-1}$. (FIGS. 7A-7B).

Surface Water Samples

Based on the difference in NOM characteristics as indicated by their $SUVA_{254}$ ($UV_{254}$/DOC) values, three types of waters were used for tests: 1) raw water collected from a lake; 2) raw water collected from a river intake (e.g., both of which serve as water sources of drinking water treatment); and 3) treated water (e.g., after coagulation, flocculation, and sedimentation) from the same water treatment plant stated above. After collection, samples were filtered with Whatman® Polycap TC Filters (0.2 μm pore size) and stored at 4° C. in the dark to minimize biological activity. DOC concentrations were measured using a Shimadzu™ TOC-VCSH high-temperature combustion analyzer with minimum reporting levels of 0.1 mg L$^{-1}$. UV absorbance at 254 nm measurement was performed using a Varian Cary® 50 spectrophotometer with a 1-cm path length quartz cell. To test the effect of NOM size (different $SUVA_{254}$ values [1.3 to 4.0 L mg-m$^{-1}$]), waters were diluted as needed to obtain comparable initial DOC content (2.5±0.5 mg L$^{-1}$). Selected characteristics of the surface waters used in the experiments are shown in Table 1.

TABLE 1

| Parameters | Units | Treated River Water (diluted) | Raw River Water (diluted) | Raw Surface Water |
|---|---|---|---|---|
| pH | — | 7.3 | 7.2 | 6.9 |
| Dissolved Organic Carbon | (mg L$^{-1}$) | 2.75 | 2.10 | 2.00 |
| $UV_{254}$ | (cm$^{-1}$) | 0.049 | 0.084 | 0.026 |
| $SUVA_{254}$ | L (mg-m)$^{-1}$ | 1.80 | 4.00 | 1.30 |

Adsorption Kinetics Tests

MIB and geosmin adsorption kinetics experiments were conducted in DDW and selected natural waters. For DDW tests, amber glass bottles of 60 mL containing 1.2 mg (equivalent to 20 mg L$^{-1}$) PAC were filled slowly with DDW (pH=7.0±0.1) containing 100 ng L$^{-1}$ MIB and geosmin each. After filling, bottles (headspace free) were shaken for various contact times for 5, 15, 30, 60, 90, 120, and 240 minutes on an orbital shaker at room temperature, and no buffer was used. At the end of each contact time, samples were filtered through a pre-washed Supor® 0.45 μm polyethersulfone polymer membrane filter and collected in 40 mL amber bottles with headspace free and extracted immediately and analyzed for MIB and geosmin as indicated before. In addition to DDW tests, following the same methodology, similar adsorption kinetic tests were conducted in different water sources (i.e., two surface waters and one treated water as stated above).

Adsorption Isotherm Tests

Adsorption isotherm experiments were conducted to compare the adsorption equilibrium capacities of PACs in both DDW and natural waters. The initial MIB and geosmin concentrations each were adjusted for each water sample and various PAC dosages were tested from 1 mg-PAC $L^{-1}$ to 50 mg-PAC $L^{-1}$. (FIGS. 7A-7B). The pH of the natural waters is presented in Table 1, and no buffer was added during the isotherm experiments. Pre-determined amounts of PAC were added to pre-washed glass amber bottles which were filled headspace-free with solutions containing MIB and geosmin (~300 ng $L^{-1}$ MIB and geosmin, each in isotherm test bottles). Then, bottles were shaken on an orbital shaker for 7 days, the pre-determined period to reach adsorption equilibrium at room temperature. At the end of the contact time, samples were filtered through a pre-washed Supor® 0.45 µm polyethersulfone polymer membrane filter to headspace-free amber bottles, extracted immediately and analyzed as indicated above. The isotherms results were modeled using the Freundlich isotherm equation:

$$q_e = K_f Ce^{1/n} \qquad (1)$$

in which, $q_e$ is equilibrium solid phase concentration (ng $mg^{-1}$),

Ce is liquid-phase concentrations (ng $L^{-1}$), $K_f$ is Freundlich isotherm constant ng $mg^{-1}$, which is an indicator of adsorption capacity, and n is empirical constant, L $ng^{-1}$, $n^{-1}$ a measure of the intensity of adsorption.

Example 1

Characterizations of Activated Carbons

The BET surface area, micropore, mesopore, and total pore volume, DFT pore volume distribution, $pH_{PZC}$, and source material of the PACs are provided in Table 2. The BET surface areas of soyhull-based PACs were higher than the commercial PACs. For instance, the BET surface area of SH4 was 2,844 $m^2$ $g^{-1}$, while Calgon Carbon™ WPL®, Calgon Carbon™ FILTRASORB®, and NORIT® 20B had similar surface areas around 1,000 $m^2$ $g^{-1}$. The Aqua-Nuchar®, with 1,703 $m^2$ $g^{-1}$, had the highest surface area among the commercial PACs tested.

Figure 8:
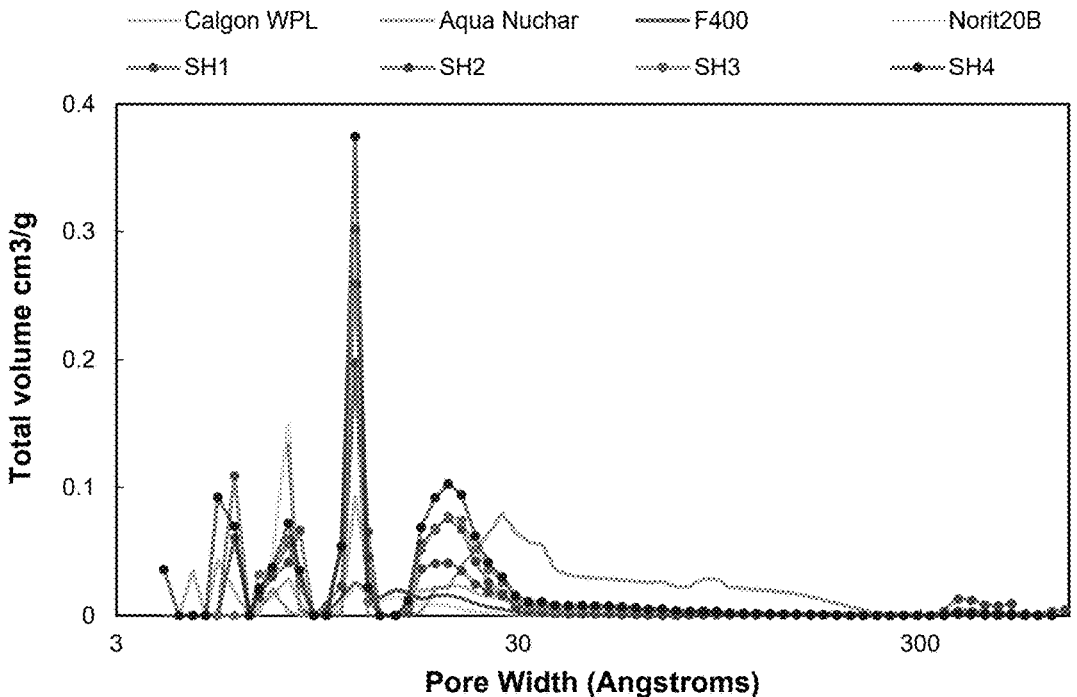
FIG. 8 presents total pore volume distribution of PACs.
Figure 9:
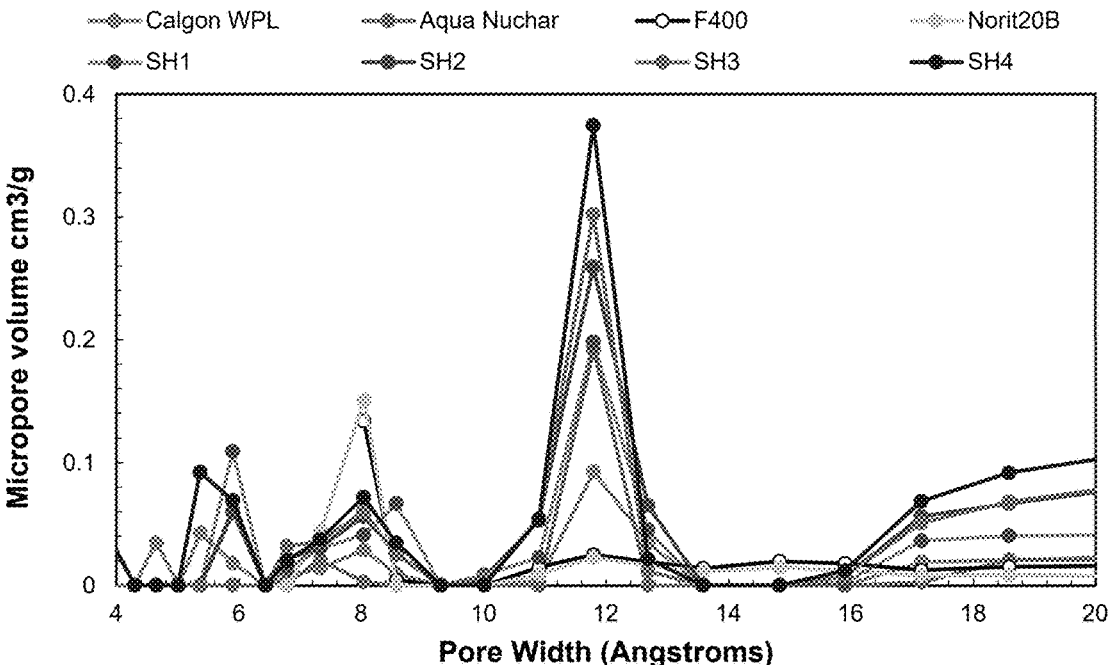
FIG. 9 presents micropore volume distribution of PACs.
Figure 10A:
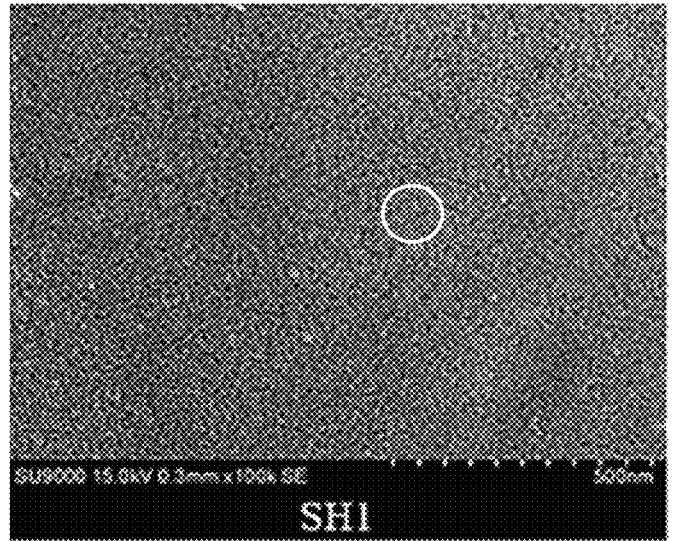
FIG. 10A presents an SEM micrograph of SEM micrograph of soyhull-based activated carbon (SH1) at ×100,000 magnification (circles for capture points at ×500,000 magnification).
Figure 10B:
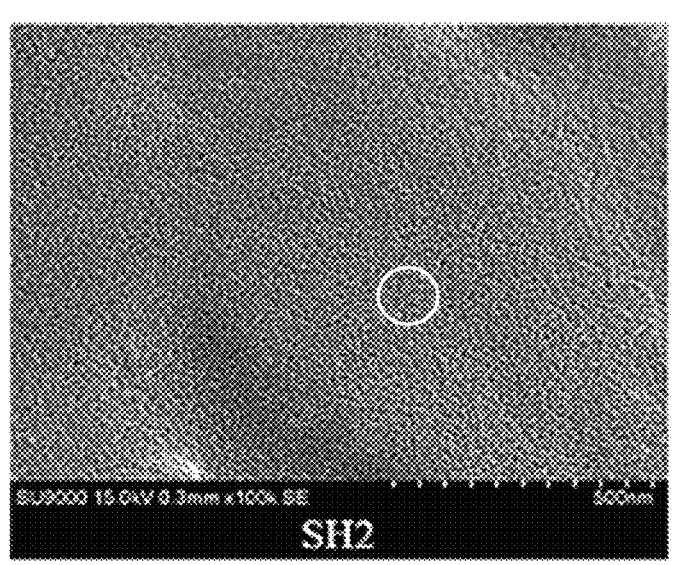
FIG. 10B presents an SEM micrograph of SEM micrograph of soyhull-based activated carbon (SH2) at ×100,000 magnification (circles for capture points at ×500,000 magnification).
Figure 10C:
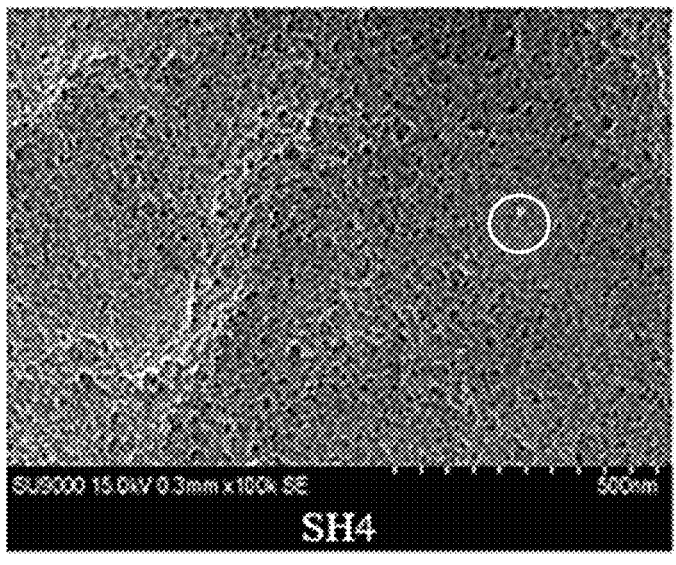
FIG. 10C presents an SEM micrograph of SEM micrograph of soyhull-based activated carbon (SH4) at ×100,000 magnification (circles for capture points at ×500,000 magnification).
Figure 10D:
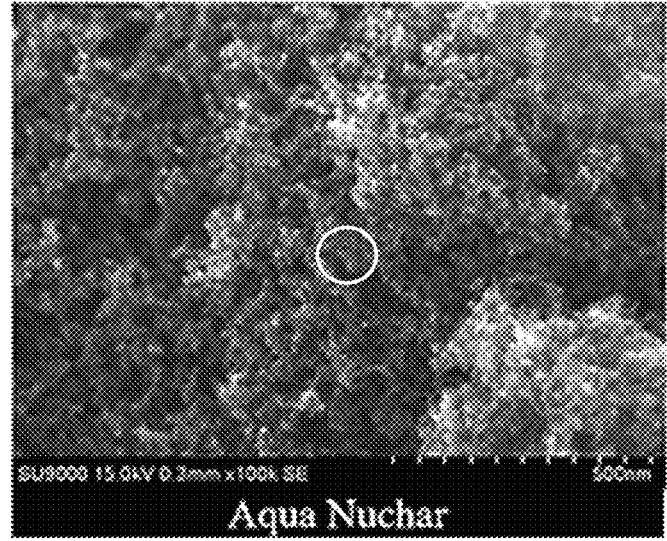
FIG. 10D presents an SEM micrograph of SEM micrograph of AquaNuchar® at ×100,000 magnification (circles for capture points at ×500,000 magnification).
Figure 10E:
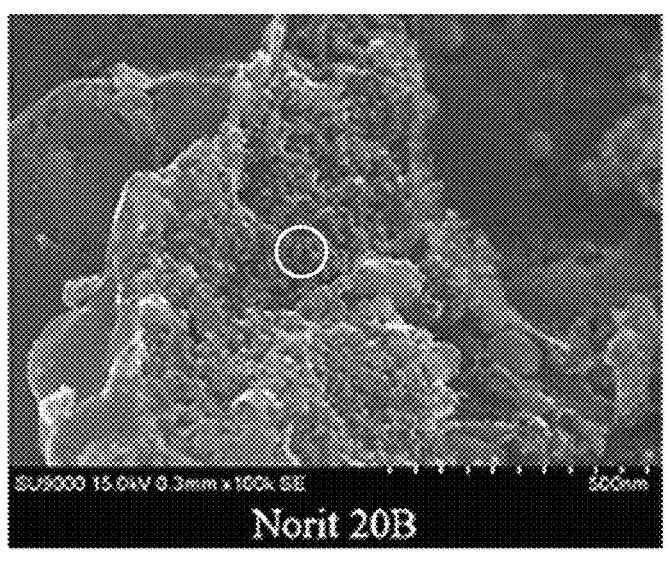
FIG. 10E presents an SEM micrograph of SEM micrograph of NORIT® 20B at ×100,000 magnification (circles for capture points at ×500,000 magnification).
Figure 10F:
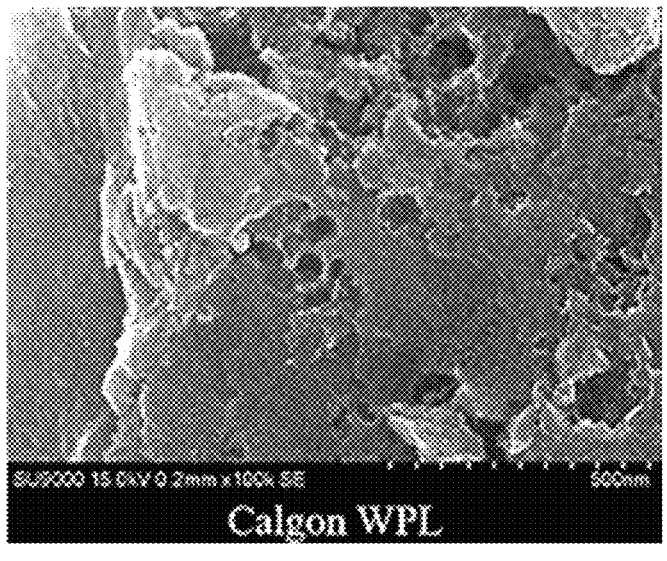
FIG. 10F presents an SEM micrograph of SEM micrograph of Calgon Carbon™ WPL® at ×100,000 magnification (circles for capture points at ×500,000 magnification).

The micropore volumes (width (w)<20 Å) of the soyhull PACs were in the range of 0.71 to 1.09 $cm^3$ $g^{-1}$, whereas the micropore volumes of commercial PACs were around 0.30 $cm^3$ $g^{-1}$. The micropore volume can play a significant role in removing MIB and geosmin. Adsorption increases with decreasing pore width because adsorption potentials between pore walls and target molecules start to overlay when the pore width is close to the molecular diameters of target compounds. However, in addition to micropore volume, the distribution of pores is also important. For instance, any micropore volume smaller than 6 Å will generally not be accessible to T&O compounds because the molecular diameters of MIB and geosmin are around 6 Å. (FIGS. 7A-7B). The total and micropore volume distributions of the adsorbents are shown in FIG. 8 and FIG. 9, respectively. The pore volumes in specific pore widths are also presented in Table 3. Soyhull-based PACs had high micropore volume (0.72-1.09 $cm^3$ $g^{-1}$), especially between 10 Å to 14 Å pore width (Table 3; FIG. 9), whereas commercially available materials AquaNuchar®, Calgon Carbon™ WPL®, NORIT® 20B, and FILTRASORB® had lower micropore volumes than the soyhull-based PACs in the same region (Table 3; FIG. 9).

The mesopore and total pore volumes are also listed in Table 2. The mesopore volume can enable rapid access to adsorption sites. The soyhull-based PACs had very similar mesopore volumes for SH1, SH2, and SH3, (~0.2 $cm^3$ $g^{-1}$), except for the largest surface area sample (SH4: 0.36 $cm^3$ $g^{-1}$). NORIT® 20B and Calgon Carbon™ FILTRASORB® had a very small amount of mesopores (<0.1 $cm^3$ $g^{-1}$), whereas AquaNuchar® had the highest mesopore volume (0.95 $cm^3$ $g^{-1}$) among all studied PACs. In addition, characterization results of commercial PACs were compared with the values reported for the same PACs in literature.

TABLE 2

| | | | | | | |
|---|---|---|---|---|---|---|
| Brunauer-Emmett-Teller surface area, Density Functional Theory model | | | | | | |
| | BET $m^2$ $g^{-1}$ | DFT $V_{micro}$ ($cm^3$ $g^{-1}$) | DFT $V_{meso}$ + macro ($cm^3$ $g^{-1}$) | $V_{total}$ ($cm^3$ $g^{-1}$) (P $Po^{-1}$ = 0.98) | $pH_{PZC}$ | Material Type |
| SH1 | 1,796 | 0.72 | 0.20 | 0.96 | 8.5 | Soyhull |
| SH2 | 2,121 | 0.78 | 0.23 | 1.06 | 9.0 | Soyhull |
| SH3 | 1,835 | 0.72 | 0.21 | 0.93 | 10.3 | Soyhull |
| SH4 | 2,844 | 1.09 | 0.36 | 1.46 | 10.4 | Soyhull |
| Calgon Carbon ™ WPL ® | 964 | 0.35 | 0.36 | 0.71 | 5.6 | Bituminous Coal |
| AquaNuchar ® | 1,703 | 0.32 | 0.95 | 1.48 | 6.5 | Wood |
| Calgon Carbon ™ FILTRASORB ® | 1,070 | 0.29 | 0.07 | 0.54 | 7.8 | Bituminous Coal |
| NORIT ® 20B | 918 | 0.31 | 0.06 | 0.45 | 9.5 | Bituminous Coal |

TABLE 3

| | DFT pore volume cm$^3$ g$^{-1}$ | | | | | | |
|---|---|---|---|---|---|---|---|
| | <7 Å | >7- 10 Å | >10- 14 Å | >14- 20 Å | >10- 20 Å | >20- 50 Å | >50 Å |
| SH1 | 0.24 | 0.11 | 0.26 | 0.11 | 0.37 | 0.12 | 0.08 |
| SH2 | 0.11 | 0.09 | 0.38 | 0.21 | 0.59 | 0.17 | 0.06 |
| SH3 | 0.17 | 0.08 | 0.30 | 0.17 | 0.47 | 0.16 | 0.05 |
| SH4 | 0.25 | 0.11 | 0.45 | 0.28 | 0.73 | 0.30 | 0.05 |
| Calgon Carbon ™ WPL | 0.12 | 0.04 | 0.13 | 0.06 | 0.19 | 0.11 | 0.25 |
| AquaNuchar ® | 0.08 | 0.00 | 0.19 | 0.04 | 0.23 | 0.56 | 0.39 |
| Calgon Carbon ™ FILTRASORB ® | 0.00 | 0.13 | 0.07 | 0.08 | 0.15 | 0.04 | 0.02 |
| NORIT ® 20B | 0.04 | 0.15 | 0.06 | 0.05 | 0.11 | 0.01 | 0.05 |

Figure 11A:
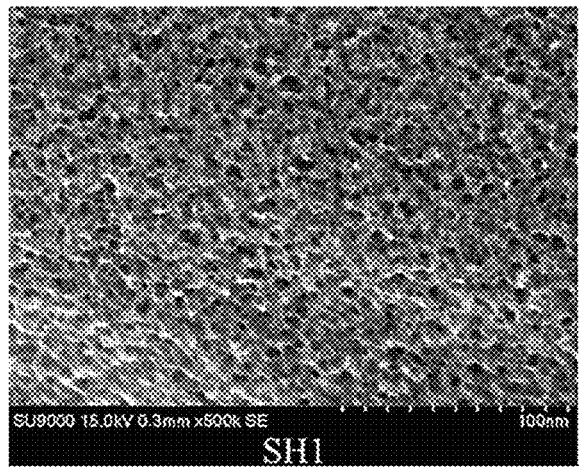
FIG. 11A presents an SEM micrograph of SH1 at ×500,000 magnification.
Figure 11B:
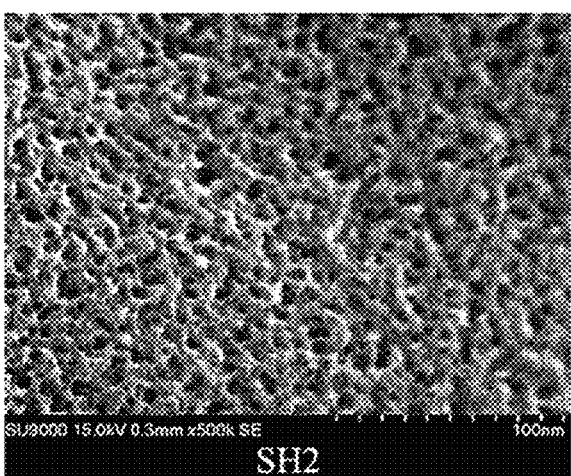
FIG. 11B presents an SEM micrograph of SH2 at ×500,000 magnification.
Figure 12:
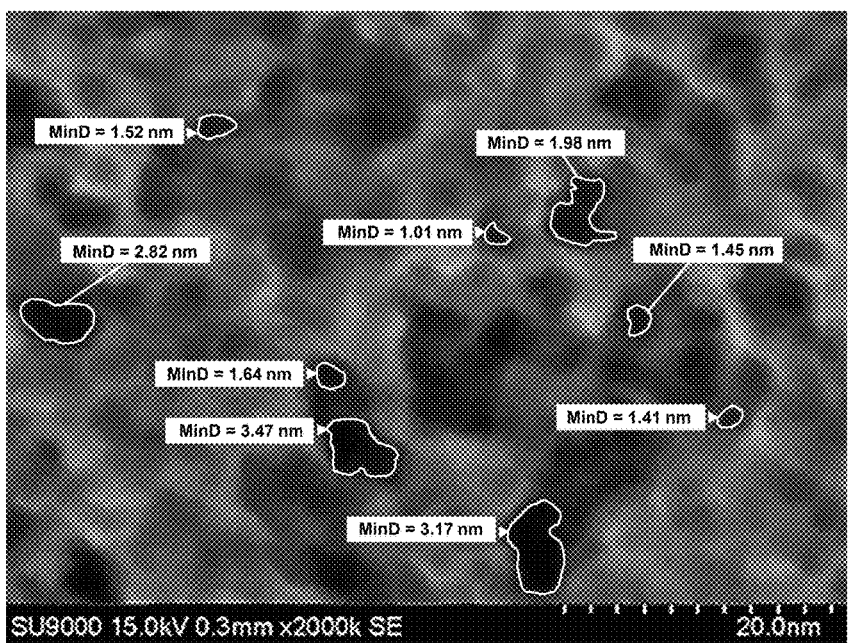
FIG. 12 presents an SEM micrograph of SH4 at ×2,000,000 magnification.

For further examination of the pore structure and surface morphology of the PACs, FE-SEM pictures were obtained (FIGS. 1A-1E). The differences in the surface and pore characteristics of PACs were noticeable. For instance, scans of microparticles at ×500,000 magnification showed soyhull-based PAC (SH4) (FIG. 1A) had a unique pore structure, exhibiting a large number of micropores at the surface of the adsorbent and sponge-like microstructure. On the other hand, AquaNuchar® (FIG. 1E), Calgon Carbon™ FILTRASORB® (FIG. 1B), and Calgon Carbon™ WPL® (FIG. 1C) had larger pore openings at the surface. This difference can also be seen at ×100,000 magnification (FIGS. 10A-10F), and the SEM images of SH1 (FIG. 11A) and SH2 (FIG. 11B) at ×500,000 magnification are presented. As shown in FIG. 12, pore widths of SH4 were calculated by using the Image-Pro analysis software at ×2000,0000 magnification. Several pore openings width (w) ~20 Å were detectable on the soyhull-based PAC surface.

The results of PAC pH$_{PZC}$ experiments showed that soyhull-based PACs have a more basic surface (pH$_{PZC}$: 8.5-10.4) than commercial PACs, except NORIT® 20B (FIG. 1D), which also had a basic surface (Table 2).

Overall, the results indicate that because of the chemical activation of the soyhull with KOH, basic carbons (pH$_{PZC}$>9.0) could be produced with relatively high BETs (>2000 m$^2$ g$^{-1}$), both micropores (>0.75 cm$^3$ g$^{-1}$) and mesopores (>0.3 cm$^3$ g$^{-1}$) present together in abundance on the structure.

Example 2

Adsorption Kinetics Tests

Figure 2A:
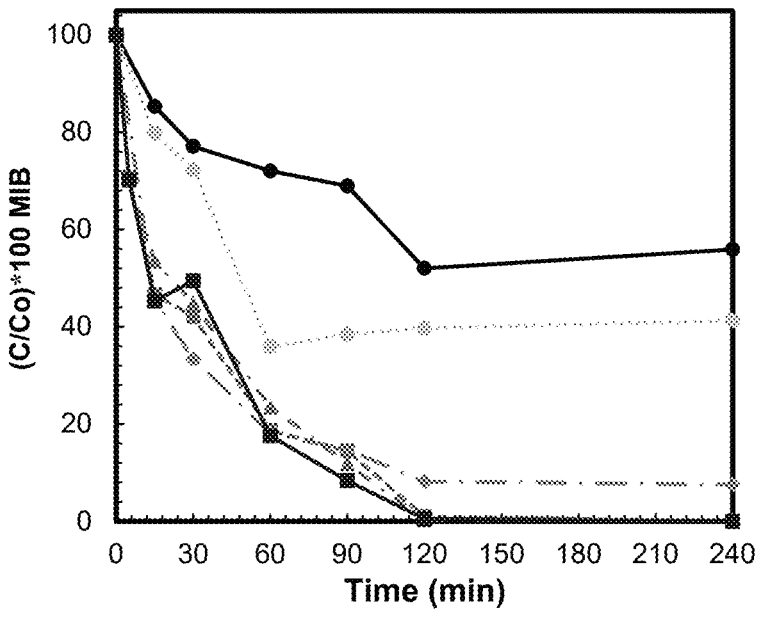
FIG. 2A presents adsorption kinetics of MIB in deionized distilled water (DDW).
Figure 2B:
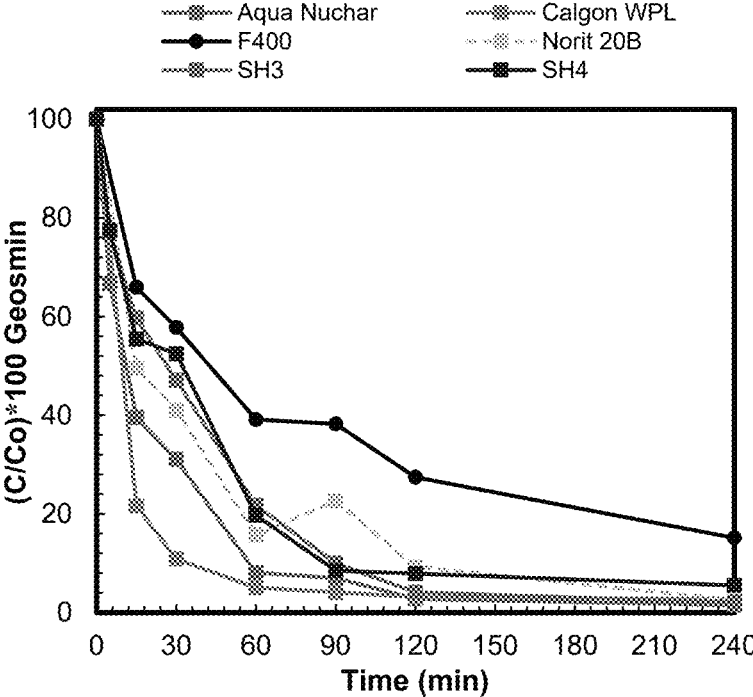
FIG. 2B presents adsorption kinetics of geosmin in DDW.

The adsorption kinetics of MIB and geosmin by the commercial and soyhull-based PACs in DDW are presented in FIGS. 2A-2B. MIB adsorptions were fast onto SH3 and SH4 (~90% removal for MIB in 90 minutes). (FIG. 2A). After two hours, >95% of MIB was removed by SH3 and SH4. Likewise, ~90% and >95% of geosmin were removed by SH3 and SH4 at 90 minutes and two hours, respectively. (FIG. 2B). On the other hand, soyhull-based PACs removed more MIB compared to geosmin, unlike the commercial PACs.

MIB and geosmin adsorption by Calgon Carbon™ WPL® and AquaNuchar® were considerably faster among the other commercial PACs (for 90-min contact time, ~90% of MIB and ~95% of geosmin were removed by Calgon Carbon™ WPL® and AquaNuchar®) (FIGS. 2A-2B, respectively). NORIT® 20B and Calgon Carbon™ FIL-TRASORB® exhibited slower adsorption kinetics, especially for MIB (for 90 minutes contact time, 30-60% of MIB and 60-80% of geosmin was removed by Calgon Carbon™ FILTRASORB® and NORIT® 20B, respectively). The slow kinetics was attributed to fewer mesopore volumes (~0.06 cm$^3$ g$^{-1}$) and their more microporous nature (i.e., higher micropore/total pore volume ratio) (Table 2). This indicates that in cases where mesopores openings are limited, it can be expected that diffusion into the micropores will be slow. In addition, results showed that the removals were better for NORIT® 20B adsorption compared to Calgon Carbon™ FILTRASORB®, while their physical characteristics are comparable (Table 2). This can be related to the relatively higher pH$_{PZC}$ (~9.8) of NORIT® 20B compared to pH$_{PZC}$ of FILTRASORB® (~7.8), suggesting a more hydrophobic surface, thus being more attractive for MIB and geosmin adsorption in DDW.

Figures 13A, 13B, 14A, 14B, 14C:
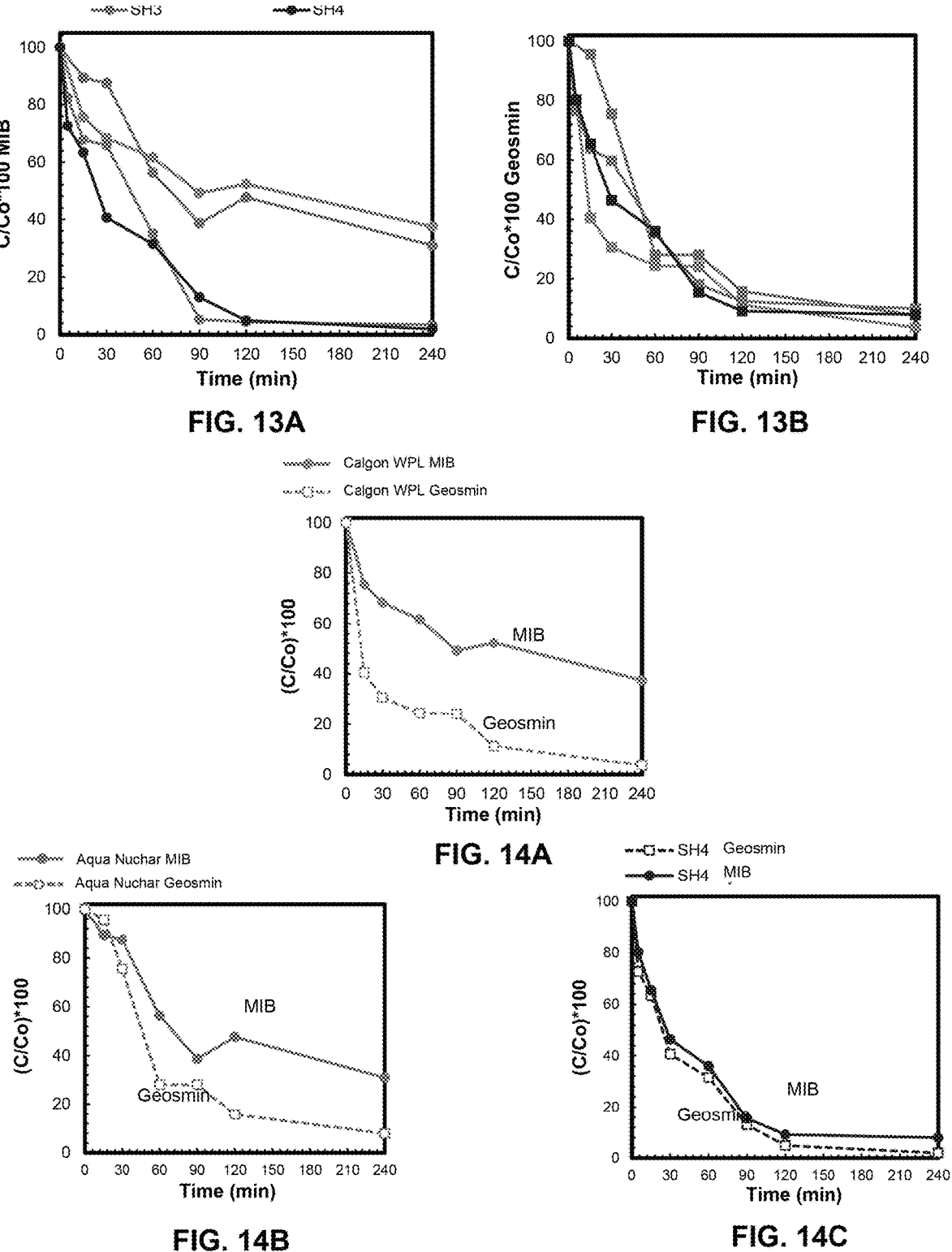
FIG. 13A presents adsorption kinetics of MIB in treated water (DOC=2.75 mg/L, SUVA$_{254}$=1.80 L/mg-m).
FIG. 13B presents adsorption kinetics of geosmin in treated water (DOC=2.75 mg/L, SUVA$_{254}$=1.80 L/mg-m).
FIG. 14A presents adsorption kinetics of MIB versus geosmin by Calgon Carbon™ WPL® in treated water (DOC=2.75 mg/L, SUVA$_{254}$=1.80 L/mg-m).
FIG. 14B presents adsorption kinetics of MIB versus geosmin by AquaNuchar® in treated water (DOC=2.75 mg/L, SUVA$_{254}$=1.80 L/mg-m).
FIG. 14C presents adsorption kinetics of MIB versus geosmin by soyhull-based PAC (SH4) in treated water (DOC=2.75 mg/L, SUVA$_{254}$=1.80 L/mg-m).

Two commercial activated carbons from DDW experiments showing the fastest removal rates (AquaNuchar® and Calgon Carbon™ WPL®) were selected for comparison with soyhull-based PACs in natural water experiments. (FIGS. 13A-13B; FIGS. 14A-14C). To test the effect of NOM, three different water sources (Table 1) were used as background waters, at similar DOC (2.5±0.5 mg L$^{-1}$) but different SUVA$_{254}$ values (1.3-4.0 L mg-m$^{-1}$). It is known that coagulation and flocculation processes are designed to remove relatively higher and more hydrophobic NOMs. Thus, treated raw water is expected to contain a relatively lower molecular weight and less hydrophobic NOM (described by lower SUVA$_{254}$ values) compared to its untreated source water. As indicated before, NOM can compete with MIB and geosmin for the same adsorption sites available on the structure of PACs. In treated waters, the removal performance of soyhull-based PAC was not influenced substantially by the presence of NOM, and relatively the same removal performance (~85% removal of both MIB and geosmin in 90 minutes of contact time by SH4) (FIG. 3B; FIG. 3D) was reached compared to DDW tests (FIGS. 3A-3D). This was attributed to the presence of higher micropore (>1 cm$^3$ g$^{-1}$) and mesopore (>0.3 cm$^3$ g$^{-1}$) volumes together in SH4 compared to the commercial PACs. However, adsorption kinetics of commercial PACs in the presence of NOM was slower (50-60% and 70-75% removals were observed for MIB and geosmin in 90 min, respectively) (FIG. 3A; FIG. 3C). This was consistent with the understanding that low molecular weight NOM molecules decreased the adsorption of MIB and geosmin by site competition.

Figures 15A, 15B, 16A, 16B, 16C:
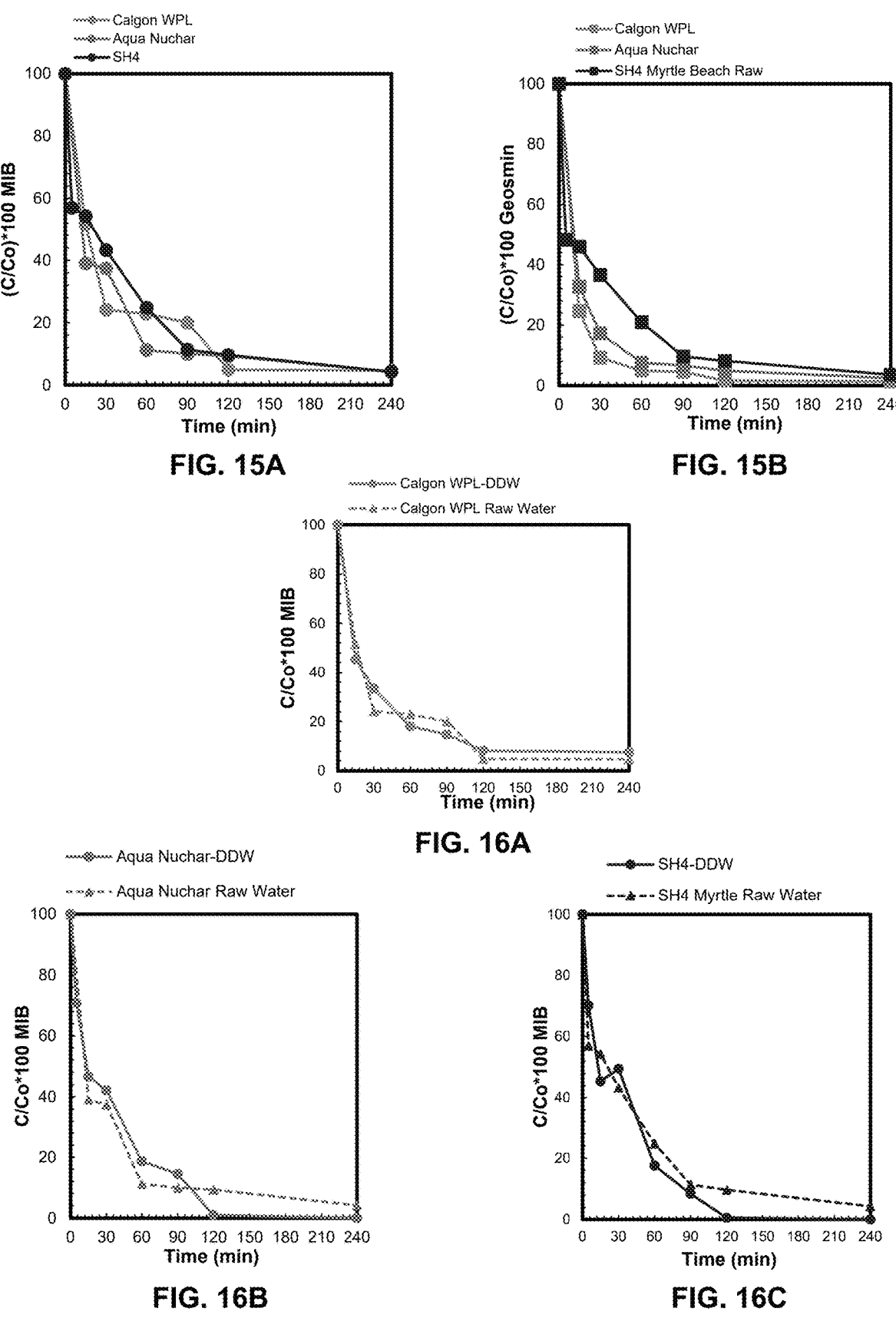
FIG. 15A presents MIB adsorption kinetics of PACs in raw water (DOC=2.1 mg L–1 SUVA$_{254}$=4 L mg-m–1, raw river water).
FIG. 15B presents geosmin adsorption kinetics of PACs in raw water (DOC=2.1 mg L–1 SUVA$_{254}$=4 L mg-m–1, raw river water).
FIG. 16A presents adsorption kinetics of MIB by Calgon Carbon™ WPL® in DDW versus raw water (DOC=2.1 mg/L SUVA$_{254}$=4 L mg-m–1, raw river water).
FIG. 16B presents adsorption kinetics of MIB by Aqua-Nuchar® in DDW versus raw water (DOC=2.1 mg/L SUVA$_{254}$=4 L mg-m–1, raw river water).
FIG. 16C presents adsorption kinetics of MIB by soyhull-based PAC (SH4) in DDW versus raw water (DOC=2.1 mg/L SUVA$_{254}$=4 L mg-m–1, raw river water).
Figure 17A:
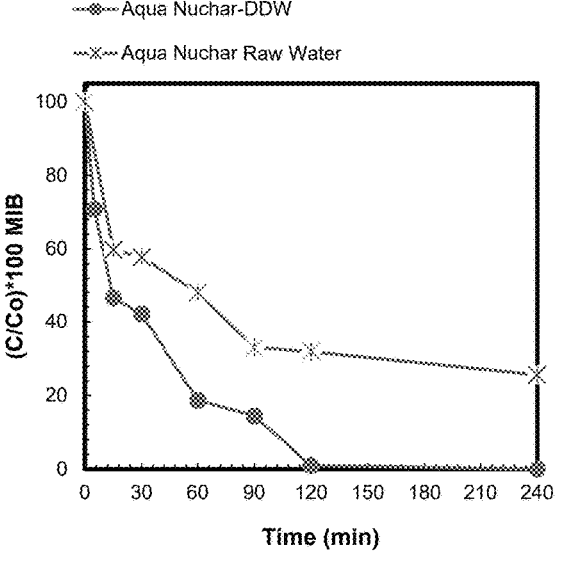
FIG. 17A presents adsorption kinetics of MIB in DDW and raw river water by AquaNuchar®.
Figure 17B:
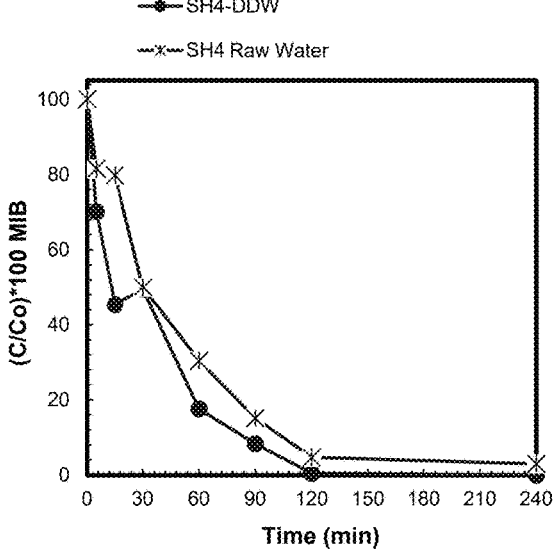
FIG. 17B presents adsorption kinetics of MIB in DDW and raw river water by SH4.
Figure 17C:
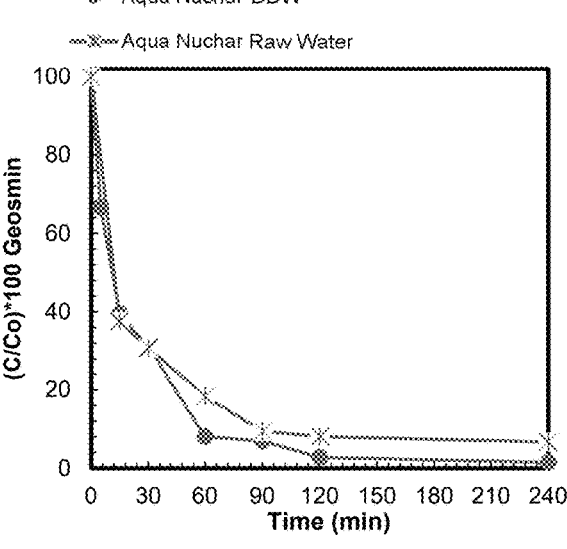
FIG. 17C presents adsorption kinetics of geosmin in DDW and raw river water by AquaNuchar®.
Figure 17D:
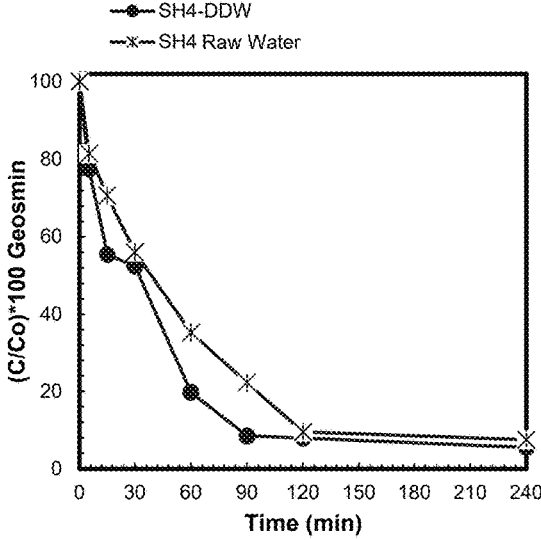
FIG. 17D presents adsorption kinetics of geosmin in DDW and raw river water by SH4.

For relatively less NOM (DOC=2.1 mg L$^{-1}$) and high SUVA$_{254}$ (4.0 L (mg-m)$^{-1}$) water (diluted river water), the effect of NOM presence on the adsorption of both MIB and geosmin was negligible compared to DDW tests (FIGS. 15A-15B; FIGS. 16A-16C). This indicated that relatively larger NOM molecules (i.e., more hydrophobic and higher molecular weight) did not compete with relatively smaller molecules like MIB and geosmin for micropores. In addition, larger NOM molecules cannot be adsorbed fast due to their slower diffusion. Further, high molecular weight NOM molecules did not seem to block the entrance of pores interfering with the adsorption of MIB and geosmin at low DOC concentration.

Figure 4A:
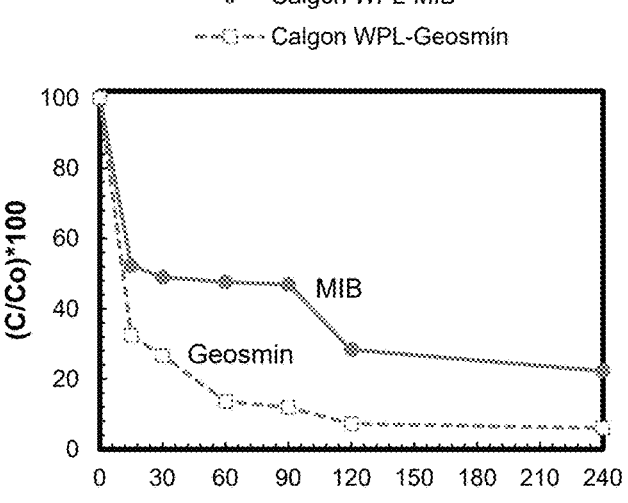
FIG. 4A presents comparison of MIB and geosmin adsorption kinetics by Calgon Carbon™ WPL® in the high $SUVA_{254}$ (4.00 L mg-m$^{-1}$) and high DOC Raw Water (5 mg DOC L$^{-1}$).
Figure 4B:
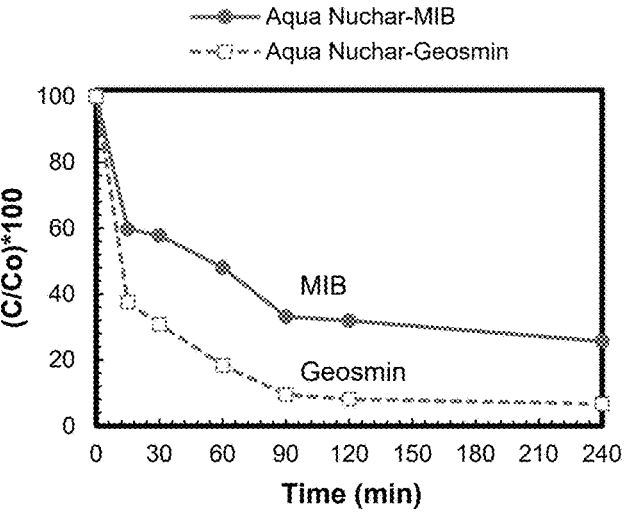
FIG. 4B presents comparison of MIB and geosmin adsorption kinetics by AquaNuchar® in the high $SUVA_{254}$ (4.00 L mg-m$^{-1}$) and high DOC Raw Water (5 mg DOC L$^{-1}$).
Figure 4C:
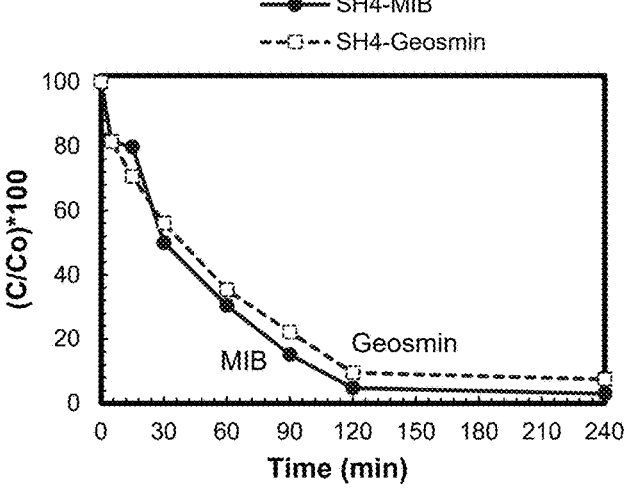
FIG. 4C presents comparison of MIB and geosmin adsorption kinetics by soyhull-based powdered activated carbon in the high $SUVA_{254}$ (4.00 L mg-m$^{-1}$) and high DOC Raw Water (5 mg DOC L$^{-1}$).

Adsorption kinetics experiments with the raw river water at higher NOM concentration (i.e., 5 mg L$^{-1}$ TOC) and high SUVA$_{254}$ (i.e., 4.0 L (mg-m)$^{-1}$) were further conducted. (FIGS. 4A-4C). Results showed that the adsorption of MIB and geosmin onto soyhull-based PAC (SH4) was not affected substantially in the presence of higher NOM concentration (i.e., ~85% removal of MIB and ~80% removal of geosmin in 90 minute-contact time), while the NOM effect was more evident for the commercially available PACs. (FIGS. 17A-17D). In soyhull-based PAC, SH4 was able to effectively remove both MIB and geosmin (FIG. 4C), whereas removal of MIB was lower than geosmin for commercial PACs. (FIGS. 4A-4B). These different kinetics patterns were attributed to a combination of mesoporosity and total pore volume, and unique sponge-like porous structures of SH4 (FIG. 1A) as compared to the commercial PACs. These results clearly show the better performance of soyhull PACs over the commercial PACs for both MIB and geosmin removal (FIGS. 4A-4C). This is important as it is generally more challenging to remove MIB than geosmin in natural waters. The simultaneous adsorption of both T&O compounds makes the soyhull-based PAC particularly attractive for applications in municipal scenarios.

Figure 18A:
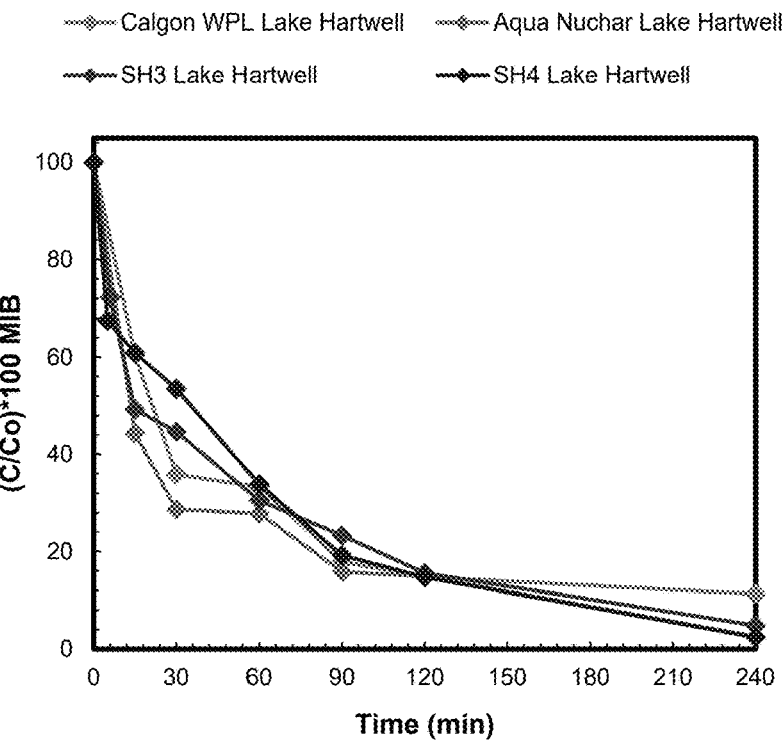
FIG. 18A presents MIB adsorption kinetics of PACs in surface water (DOC=2 mg/L, SUVA$_{254}$=1.3 L/mg-m).
Figure 18B:
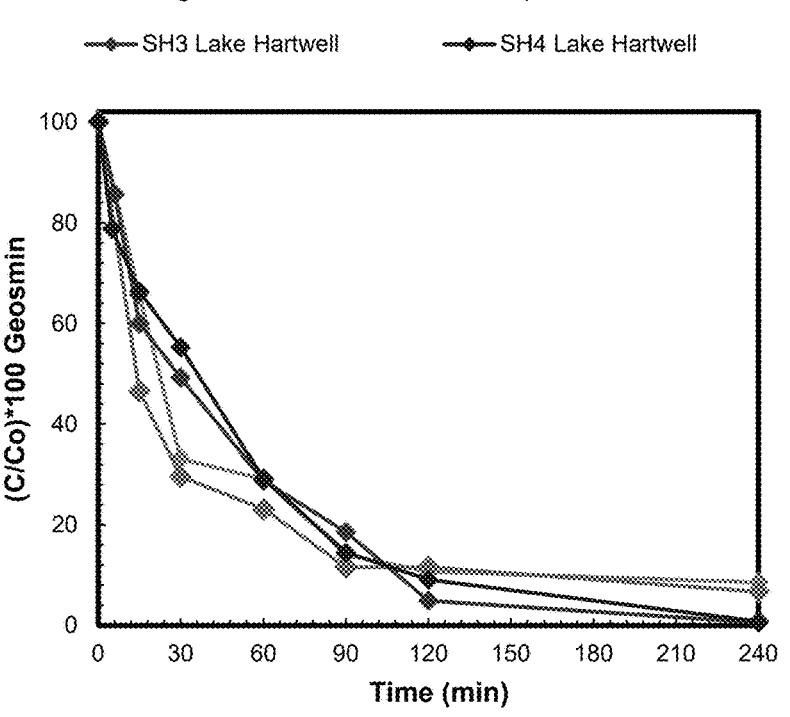
FIG. 18B presents geosmin adsorption kinetics of PACs in surface water (DOC=2 mg/L, SUVA$_{254}$=1.3 L/mg-m).

In addition, surface water with a lower $SUVA_{254}$ (1.3 L $(mg-m)^{-1}$) and low NOM content (DOC: 2.00 mg $L^{-1}$) was also used in the adsorption kinetics tests. These characteristics did not appear to make a significant difference in the adsorption of both MIB and geosmin by commercial- and soyhull-based PACs. (FIGS. 18A-18B).

Figures 19A, 19B, 19C, 19D, 19E, 19F:
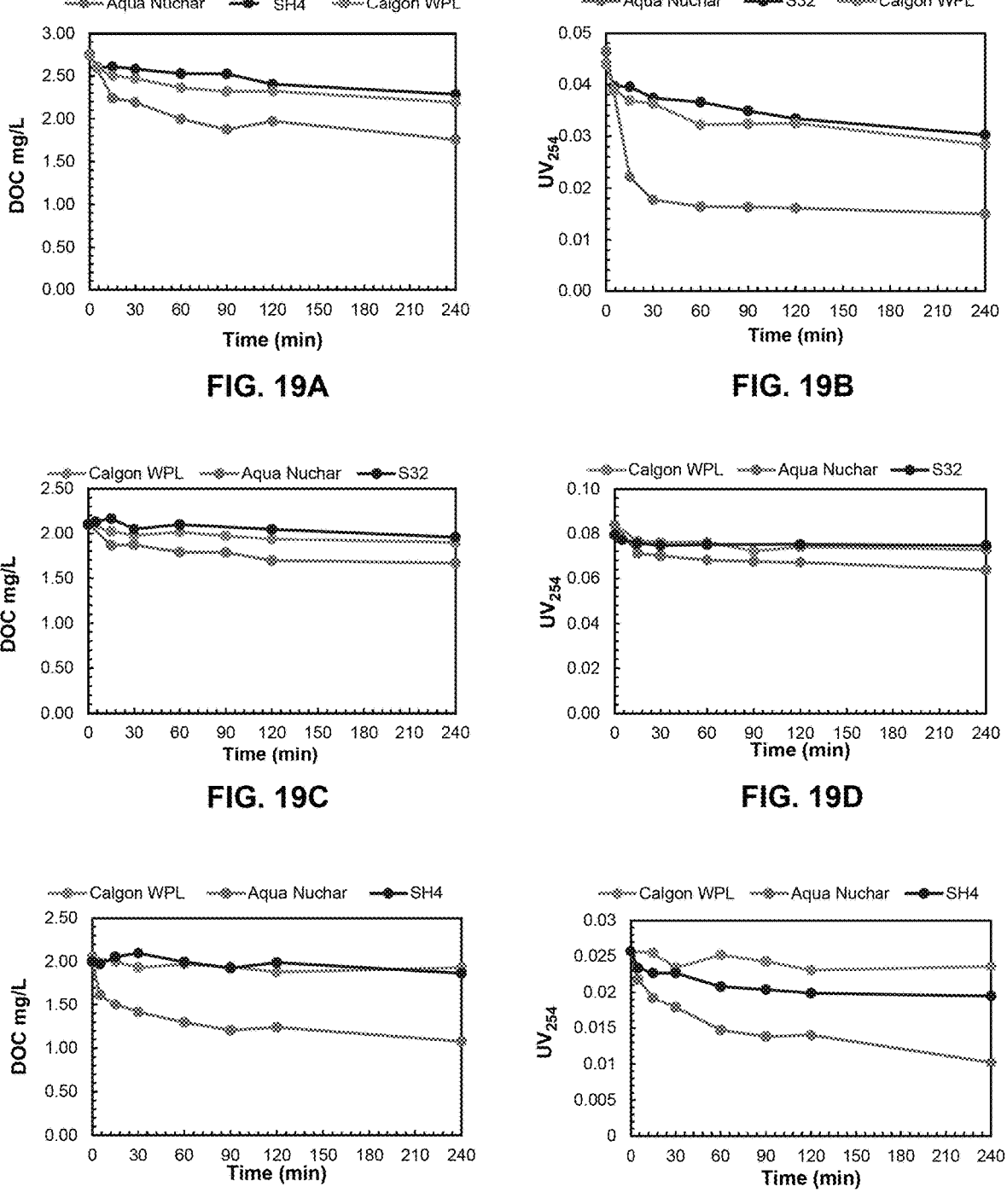
FIG. 19A presents NOM changes in treated water (DOC=2.75 mg/L, SUVA$_{254}$=1.8 L/mg-m).
FIG. 19B presents UV changes in treated water (DOC=2.75 mg/L, SUVA$_{254}$=1.8 L/mg-m).
FIG. 19C presents NOM changes in raw water (DOC=2.1 mg/L, SUVA$_{254}$=4 L/mg-m).
FIG. 19D presents UV changes in raw water (DOC=2.1 mg/L, SUVA$_{254}$=4 L/mg-m).
FIG. 19E presents NOM changes in surface water (DOC=2 mg/L, SUVA$_{254}$=1.3 L/mg-m).
FIG. 19F presents UV changes in surface water (DOC=2 mg/L, SUVA$_{254}$=1.3 L/mg-m).

DOC and $UV_{254}$ analyses were also conducted before and after adsorption during the kinetic tests to examine adsorption of NOM. (FIGS. 19A-19F). Treated river water and surface water are low $SUVA_{254}$ waters with low molecular weight of NOM molecules, and some NOM adsorption by PACs was observed, suggesting access of some lower molecular weight of NOM components to some meso- and micropores (FIG. 19A; FIG. 19C). On the other hand, NOM adsorption was lower in the raw river water, which contains high molecular weight of NOM molecules (FIG. 19B). In particular, AquaNuchar® adsorbed much more NOM in the raw and treated river, and surface water compared to Calgon Carbon™ WPL® and SH4, which was attributed to its higher mesopore volume.

Overall, these results suggest two different impacts exerted by NOM molecules according to their size (i.e., low, or high molecular weight). High molecular weight NOM molecules decreased the removal efficiency by pore blockage or hindrance mechanism since PACs did not adsorb considerable amounts of NOM (raw water; FIG. 19B). Calgon Carbon™ WPL® and SH4, with similar mesopore volumes, exhibited similar NOM adsorption in all surface waters. However, their adsorption kinetics of MIB and geosmin were different due to their different pore size distributions. On the other hand, NOM site competition mechanism decreased the adsorption of MIB and geosmin on commercial PACs in the presence of low molecular weight of NOM (i.e., 2.75 mg $L^{-1}$ TOC) (FIG. 19A), whereas SH4 was not substantially affected by low molecular weight of NOM, which was attributed to its unique sponge-like pore structure and high micropore volume (1.09 $cm^3$ $g^{-1}$), which was three times more than commercial PACs (FIG. 1A).

Example 3

Adsorption Isotherm Tests

Figure 5A:
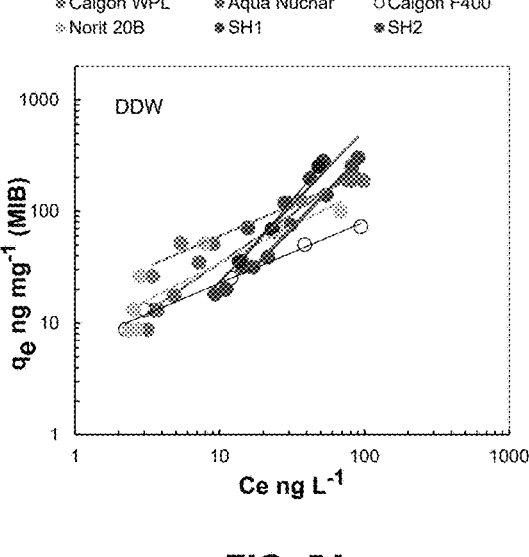
FIG. 5A presents adsorption isotherms of MIB in DDW (DOC: 2 mg L$^{-1}$SUVA$_{254}$: 1.30 L (mg-m)$^{-1}$).
Figure 5B:
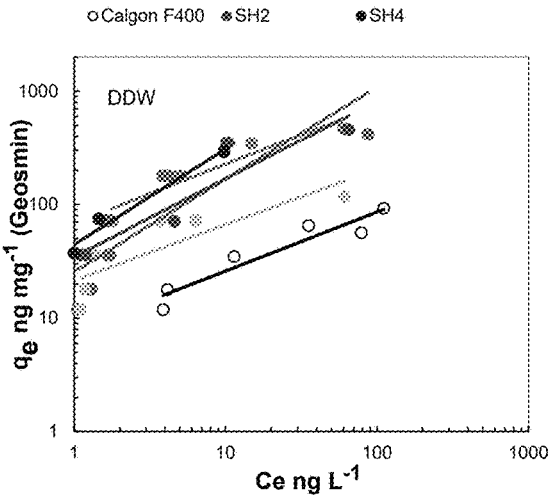
FIG. 5B presents adsorption isotherms of geosmin in DDW (DOC: 2 mg L$^{-1}$SUVA$_{254}$: 1.30 L (mg-m)$^{-1}$).
Figure 5C:
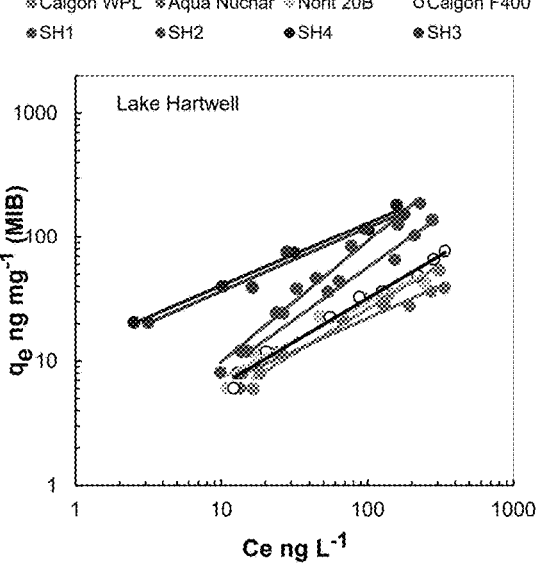
FIG. 5C presents adsorption isotherms of MIB in surface water (DOC: 2 mg L$^{-1}$SUVA$_{254}$: 1.30 L (mg-m)$^{-1}$).
Figure 5D:
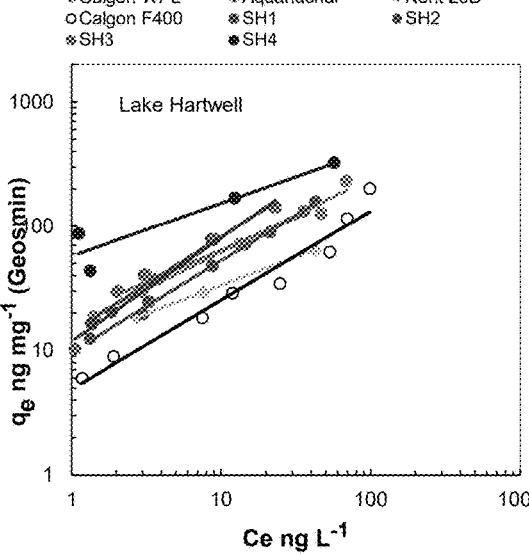
FIG. 5D presents adsorption isotherms of geosmin in surface water (DOC: 2 mg L$^{-1}$SUVA$_{254}$: 1.30 L (mg-m)$^{-1}$).

FIGS. 5A-5D show adsorption isotherm results for all PACs in DDW for MIB and geosmin. These isotherms results were modeled using the Freundlich isotherm equation (Table 4). The equilibrium concentration ranged from 1 ng $L^{-1}$ to 110 ng $L^{-1}$ in DDW (FIGS. 5A-5B). Soyhull-based PACs, Calgon Carbon™ WPL®, and AquaNuchar® exhibited, in general, higher uptakes than Calgon Carbon™ FILTRASORB® and NORIT® 20B. Geosmin adsorption was higher than MIB due to its more hydrophobic characteristic and flat molecular structure (FIGS. 7A-7B). In addition, adsorption isotherm tests were conducted in surface waters with different NOM characteristics but similar NOM concentrations of around 2 mg DOC $L^{-1}$ (FIG. 5C; FIG. 5D). Soyhull-based PACs showed a higher degree of adsorption for MIB than commercial PACs. (FIG. 5A; FIG. 5C). For example, the adsorption capacity of SH4 was 146 ng $mg^{-1}$ at the equilibrium concertation of 200 ng $L^{-1}$, whereas commercially available PAC capacities were around 40 ng $mg^{-1}$ at the similar equilibrium concentrations in the treated water. In the raw water, soyhull-based PACs also performed better than the commercial. (FIGS. 5C-5D). The adsorption capacity of SH2 was 180 ng $mg^{-1}$, whereas commercially available PAC capacities were around 100 ng $mg^{-1}$ for MIB. For the adsorption isotherm test with surface water, the equilibrium concentrations varied from 1 ng $L^{-1}$ to 330 ng $L^{-1}$ (FIG. 5C). The MIB adsorption capacity was found around 180 ng $mg^{-1}$ for soyhull-based PACs at the equilibrium concentration of about 160 ng $L^{-1}$, whereas it was only around 50 ng $mg^{-1}$ for commercial PACs at the equilibrium concentration of about 300 ng $L^{-1}$ (FIG. 5A; FIG. 5C). Although surface and raw river waters had similar TOC concentrations, adsorption capacities of MIB and geosmin were different for commercial PACs (FIGS. 5C-5D).

Example 4

Correlation Between Adsorption Capacity and Pore Size Distribution

Different pore size regions have been reported as effective to remove MIB and geosmin. For instance, the adsorption capacity of MIB may be related to the micropore volume in the range of 10 to 12 Å in both DDW and surface water. However, a correlation between adsorption capacities of MIB and geosmin and micropore volume in the 10-12 Å pore size region has not been observed. It was concluded that total micropore volume might be a better parameter representing the adsorption capacity for MIB and geosmin. (FIGS. 20A-20D). In some instances, pore volume in small micropores (i.e., 6-12 Å) have poor correlation (i.e., $R^2$ value is 0.64 in DDW and 0.62 in natural waters). Previously, a correlation of larger micropores and small mesopores (e.g., 12 Å-100 Å) for the adsorption of MIB in non-equilibrium conditions was observed. (FIG. 20A; FIG. 20C).

TABLE 4

| | | MIB | | Geosmin | |
|---|---|---|---|---|---|
| | | $K_f$ | $n^{-1}$ | $K_f$ | $n^{-1}$ |
| DDW | SH4 | 0.58 | 1.55 | 44.35 | 0.84 |
| | SH2 | 1.01 | 1.36 | 34.55 | 0.69 |
| | SH1 | 0.70 | 1.34 | NR | NR |
| | FILTRASORB ® | 6.41 | 0.55 | 7.82 | 0.52 |
| | AquaNuchar ® | 4.58 | 0.87 | 25.58 | 0.81 |
| | NORIT ® 20B | 7.43 | 0.66 | 21.44 | 0.49 |

TABLE 4-continued

| | | MIB | | Geosmin | |
|---|---|---|---|---|---|
| | | $K_f$ | $n^{-1}$ | $K_f$ | $n^{-1}$ |
| Treated Water | SH4 | 31.47 | 0.31 | NR | NR |
| | SH2 | 0.87 | 0.88 | NR | NR |
| | SH1 | 5.98 | 0.4 | NR | NR |
| | FILTRASORB ® | 2.67 | 0.43 | NR | NR |
| | AquaNuchar ® | 0.32 | 0.76 | NR | NR |
| | NORIT ® 20B | 2.77 | 0.42 | NR | NR |
| | Calgon Carbon ™ WPL | 0.001 | 1.86 | NR | NR |
| Raw River Water | SH2 | 2.71 | 0.81 | 8.53 | 0.79 |
| | SH1 | 2.47 | 0.73 | 4.16 | 0.83 |
| | FILTRASORB ® | 0.41 | 0.98 | 3.84 | 0.61 |
| | AquaNuchar ® | 0.63 | 0.79 | 9.32 | 0.53 |
| | NORIT ® 20B | 1.96 | 0.68 | 3.90 | 0.67 |
| | Calgon Carbon ™ WPL ® | 0.15 | 1.19 | 9.61 | 0.64 |
| Surface Water | SH4 | 12.64 | 0.51 | 38.99 | 0.55 |
| | SH3 | 11.17 | 0.51 | 19.49 | 0.63 |
| | SH2 | 1.03 | 0.98 | 13.94 | 0.77 |
| | SH1 | 1.20 | 0.84 | 9.68 | 0.73 |
| | FILTRASORB ® | 1.29 | 0.7 | 4.87 | 0.72 |
| | AquaNuchar ® | 1.96 | 0.53 | 19.52 | 0.52 |
| | NORIT ® 20B | 1.79 | 0.61 | 11.64 | 0.46 |
| | Calgon Carbon ™ WPL ® | 0.99 | 0.71 | 15.64 | 0.6 | where, $K_f$ is Freundlich isotherm constant ng mg$^{-1}$, which is an indicator of adsorption capacity, and n is empirical constant, L ng$^{-1}$, n$^{-1}$ a measure of the intensity of adsorption.

Figure 6A:
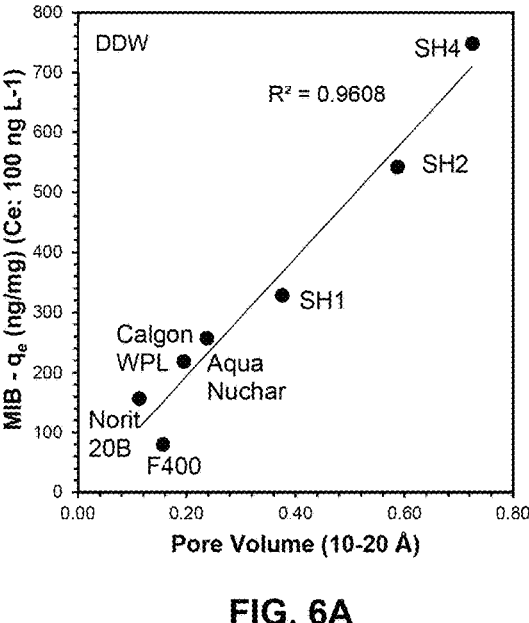
FIG. 6A presents correlation between adsorption capacity and pore size distribution in DDW for MIB.
Figure 6B:
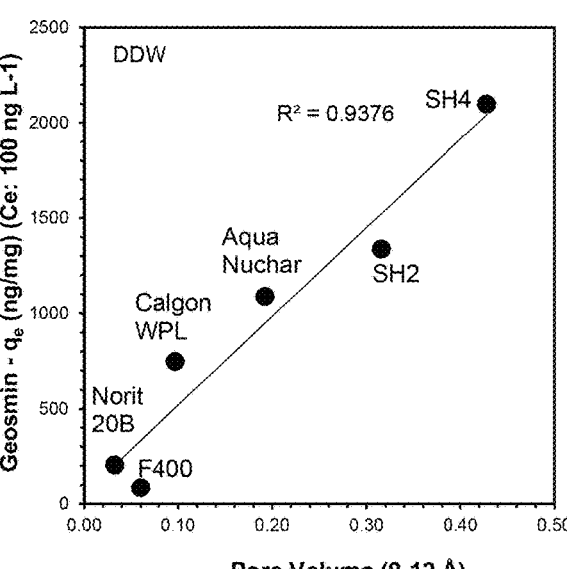
FIG. 6B presents correlation between adsorption capacity and pore size distribution in DDW for geosmin.

In this study, different pore size ranges (i.e., 6-12 Å, 9-12 Å, 10-20 Å, 6-50 Å, 10-50 Å, and 10-100 Å) were compared for their adsorption capacities at different equilibrium concentrations. (FIGS. 20A-20D). The Freundlich isotherm constants ($K_f$ and $n^{-1}$) (Table 4) were used to calculate the adsorbed amounts at different equilibrium concentrations. $R^2$ values for correlation between adsorption capacity of MIB and geosmin, and pore size at 50, 100 and 200 ng L$^{-1}$ liquid-phase equilibrium concentration are provided in Table 5. (FIGS. 20A-20D; FIGS. 6A-6D). In the adsorption isotherm tests in DDW, the 10-20 Å carbon pore size regions were linearly correlated with adsorption capacities for MIB (FIG. 6A), whereas the 9-12 Å carbon pore size regions were linearly correlated with adsorption capacities for geosmin (FIG. 6B). This difference was attributed to the planar molecular structure of geosmin. The $R^2$ value was around 0.95 for both MIB and geosmin in DDW water. (FIGS. 6A-6B).

TABLE 5

| | | Ce: 50 ng L$^{-1}$ | | | | | | |
|---|---|---|---|---|---|---|---|---|
| | | MIB-$R^2$ | | | | Geosmin-$R^2$ | | |
| Pore width (Å) | DDW | Treated Water | Raw River Water | Sur-face Water | DDW | Treated Water | Raw River Water | Sur-face Water |
| 6-12 | 0.81 | 0.79 | 0.71 | 0.72 | 0.85 | NR | 0.59 | 0.82 |
| 9-12 | 0.82 | 0.76 | 0.54 | 0.73 | 0.92 | NR | 0.66 | 0.91 |
| 10-20 | 0.82 | 0.90 | 0.78 | 0.76 | 0.88 | NR | 0.80 | 0.94 |
| 6-50 | 0.78 | 0.66 | 0.31 | 0.55 | 0.86 | NR | 0.44 | 0.80 |
| 10-50 | 0.73 | 0.49 | 0.15 | 0.44 | 0.83 | NR | 0.36 | 0.74 |
| 10-100 | 0.59 | 0.33 | 0.05 | 0.30 | 0.70 | NR | 0.20 | 0.57 |
| | | Ce: 100 ng L$^{-1}$ | | | | | | |
| | | MIB-$R^2$ | | | | Geosmin-$R^2$ | | |
| Pore width (Å) | DDW | Treated Water | Raw River Water | Sur-face Water | DDW | Treated Water | Raw River Water | Sur-face Water |
| 6-12 | 0.93 | 0.75 | 0.65 | 0.78 | 0.87 | NR | 0.64 | 0.78 |
| 9-12 | 0.93 | 0.72 | 0.55 | 0.80 | 0.94 | NR | 0.69 | 0.87 |
| 10-20 | 0.96 | 0.79 | 0.81 | 0.86 | 0.84 | NR | 0.85 | 0.93 |

TABLE 5-continued

| | | | | | | | | |
|---|---|---|---|---|---|---|---|---|
| 6-50 | 0.86 | 0.65 | 0.30 | 0.58 | 0.92 | NR | 0.43 | 0.73 |
| 10-50 | 0.75 | 0.50 | 0.15 | 0.47 | 0.90 | NR | 0.33 | 0.67 |
| 10-100 | 0.58 | 0.35 | 0.04 | 0.31 | 0.79 | NR | 0.17 | 0.49 |
| | | Ce: 200 ng L$^{-1}$ | | | | | | |
| | | MIB-$R^2$ | | | | Geosmin-$R^2$ | | |
| Pore width (Å) | DDW | Treated Water | Raw River Water | Sur-face Water | DDW | Treated Water | Raw River Water | Sur-face Water |
| 6-12 | 0.93 | 0.80 | 0.56 | 0.77 | 0.81 | NR | 0.68 | 0.70 |
| 9-12 | 0.93 | 0.79 | 0.52 | 0.79 | 0.87 | NR | 0.70 | 0.79 |
| 10-20 | 0.97 | 0.90 | 0.81 | 0.89 | 0.74 | NR | 0.88 | 0.87 |
| 6-50 | 0.84 | 0.69 | 0.26 | 0.57 | 0.90 | NR | 0.42 | 0.63 |
| 10-50 | 0.71 | 0.54 | 0.13 | 0.45 | 0.88 | NR | 0.31 | 0.57 |
| 10-100 | 0.54 | 0.37 | 0.03 | 0.28 | 0.80 | NR | 0.16 | 0.41 |

Ce is liquid-phase concentrations (ng L$^{-1}$)

Figure 6C:
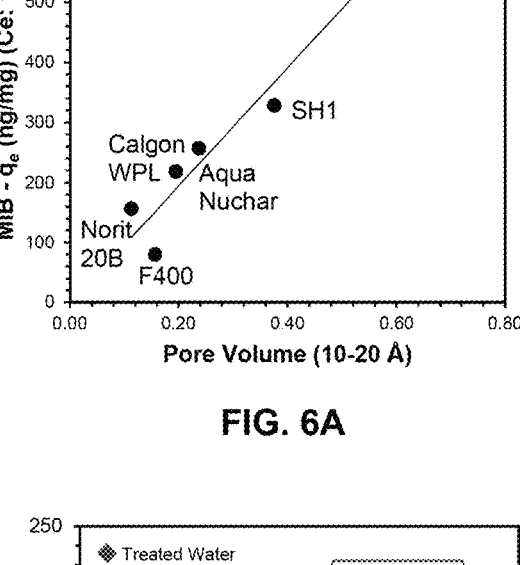
FIG. 6C presents correlation between adsorption capacity and pore size distribution in surface waters for MIB.
Figure 6D:
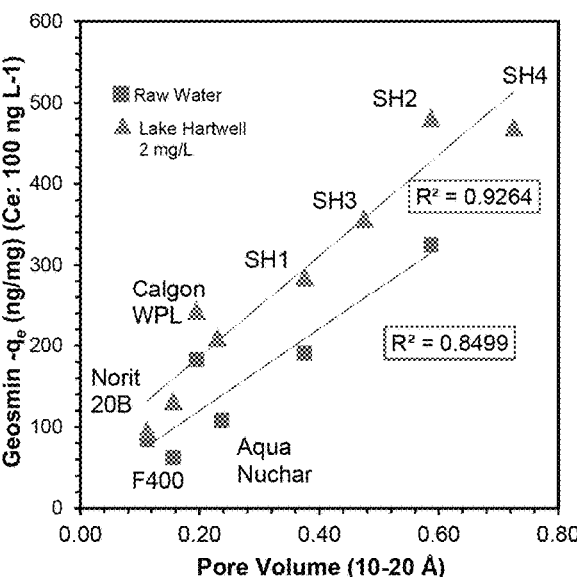
FIG. 6D presents correlation between adsorption capacity and pore size distribution in surface waters for geosmin.

In the presence of NOM, correlations have also been examined between the MIB and geosmin adsorption capacity of PACs and their pore volumes in different pore size regions. (FIGS. 20A-20D; FIGS. 6A-6D). The best correlation was found for 10-20 Å for both MIB and geosmin, as shown in FIG. 6C and FIG. 6D. The $R^2$ values were close to 0.90 for both MIB and geosmin in natural waters. The differences in the $pH_{PZC}$ values of PACs did not influence the obtained correlations. This also explains superior characteristics of soyhull PACs over commercial PACs due to their higher pore volumes in the pore size range of 10-20 Å, which were critical for MIB and geosmin adsorption in the presence of NOM. (FIGS. 20A-20B).

While certain embodiments of the disclosed subject matter have been described using specific terms, such description is for illustrative purposes only, and it is to be understood that changes and variations may be made without departing from the spirit or scope of the subject matter.

What is claimed is:

1. A soyhull-based activated carbon, comprising a Brunauer-Emmett-Teller (BET) surface area of from about 750 m²/g to about 2900 m²/g and a micropore volume of from about 0.50 cm³/g to about 1.2 cm³/g, wherein the soyhull-based activated carbon comprises an overall positive surface charge as measured by the pH of point of zero charges (pH$_{PZC}$) of at least about 7.0.

2. The soyhull-based activated carbon of claim 1, further comprising an overall positive charge as measured by the pH$_{PZC}$ of from about 8.5 to about 10.4.

3. The soyhull-based activated carbon of claim 1, wherein the Brunauer-Emmett-Teller (BET) surface area is from about 1790 m$^2$/g to about 2850 m$^2$/g.

4. The soyhull-based activated carbon of claim 1, wherein the micropore volume is from about 0.80 cm$^3$/g to about 1.1 cm$^3$/g.

5. The soyhull-based activated carbon of claim 1, wherein a mesopore volume is from about 0.20 cm$^3$/g to about 0.40 cm$^3$/g.

6. The soyhull-based activated carbon of claim 1, wherein the total pore volume is from about 0.90 cm$^3$/g to about 1.50 cm$^3$/g.

7. A method of removing a contaminant from an aqueous medium post-chlorination, the method comprising:
    contacting the aqueous medium comprising one or more contaminants with a soyhull-based activated carbon, wherein the soyhull-based activated carbon comprises an overall positive surface charge as measured by the pH of point of zero charges (pH$_{PZC}$) of at least about 7.0;
    adsorbing the one or more contaminants by the soyhull-based activated carbon, wherein, in about 90 minutes, there is a 75% reduction in the concentration of the one or more contaminants in the aqueous medium comprising at least about 5 mg/L of total organic carbon.

8. The method of claim 7, wherein the contaminant comprises a cyanobacteria-derived metabolite.

9. The method of claim 8, wherein the cyanobacteria-derived metabolite comprises 2-Methylisoborneol (MIB), geosmin, or a combination thereof.

10. The method of claim 7, wherein the contaminant comprises a small molecule.

11. The method of claim 10, wherein the small molecule comprises a molecular weight of from about 100 g/mol to about 500 g/mol.

12. The method of claim 7, wherein the aqueous medium is selected from distilled, deionized, or natural waters.

13. The method of claim 7, wherein the contaminant comprises a molecular weight of less than about 500 g/mol.

14. A method for forming an activated carbon comprising:
    carbonizing a soyhull in the absence of oxygen;
    activating the carbonized soyhull according to a physical or chemical activation process, wherein the activation process comprises pyrolyzing the carbonized soyhull at a temperature of about 800° C. or less, wherein the method of activating the carbonized soyhull comprises:
    incubating the carbonized soyhull with a chemical activating sept for about 6 hours or great; and
    drying the carbonized soyhull mixed with the chemical activating agent at a temperature of about 105° C. or greater prior to the step of pyrolyzing the carbonized soyhull, wherein the chemical activating agent and carbonized soyhull are incubated at a weight ratio of from about 1:1 to about 6:1.

15. The method of claim 14, wherein the chemical activating agent is a hydroxide activating agent.

16. The method of claim 15, wherein the hydroxide activating agent comprises potassium hydroxide, lithium hydroxide, sodium hydroxide, cesium hydroxide, rubidium hydroxide, or a combination thereof.

17. The method of claim 14, wherein the carbonized soyhull is pyrolyzed at a temperature of from about 700° C. to about 900° C.

18. The method of claim 14, wherein the carbonization is carried out for a time period of about one hour or more in the absence of oxygen.

19. The method of claim 14, wherein the carbonized soyhull is pyrolyzed in the presence of steam.

20. The method of claim 14, further comprising incubating and carbonizing the soyhull in a one-step process.

* * * * *